United States Patent
Howland et al.

(10) Patent No.: US 6,668,868 B2
(45) Date of Patent: *Dec. 30, 2003

(54) WOVEN FABRIC CONSTRUCTIONS HAVING HIGH COVER FACTORS AND FILL YARNS WITH A WEIGHT PER UNIT LENGTH LESS THAN THE WEIGHT PER UNIT LENGTH OF WARP YARNS OF THE FABRIC

(75) Inventors: Charles A. Howland, Temple, NH (US); Mark Hannigan, Wakefield, MA (US)

(73) Assignee: Warwick Mills, Inc, New Ipswich, NH (US)

( * ) Notice: Subject to any disclaimer, the term of this patent is extended or adjusted under 35 U.S.C. 154(b) by 99 days.

This patent is subject to a terminal disclaimer.

(21) Appl. No.: 09/943,752

(22) Filed: Aug. 30, 2001

(65) Prior Publication Data

US 2002/0124904 A1 Sep. 12, 2002

Related U.S. Application Data

(60) Provisional application No. 60/229,242, filed on Aug. 30, 2000.

(51) Int. Cl.[7] ................................................. F41H 1/02
(52) U.S. Cl. .............................. 139/383 R; 139/DIG. 1; 2/2.5; 442/205
(58) Field of Search ........................ 2/2.5; 139/DIG. 1, 139/383 R; 442/205

(56) References Cited

U.S. PATENT DOCUMENTS

| | | | |
|---|---|---|---|
| 1,382,718 A | | 6/1921 | Egerton |
| 1,656,832 A | | 1/1928 | Schäfer |
| 1,672,008 A | | 6/1928 | Stiattesi |
| 4,737,401 A | * | 4/1988 | Harpell et al. .............. 442/187 |
| 4,868,040 A | * | 9/1989 | Hallal et al. ................. 442/234 |
| 4,965,919 A | | 10/1990 | Fujita et al. |
| 5,198,280 A | * | 3/1993 | Harpell et al. .............. 428/102 |
| 5,308,689 A | | 5/1994 | Shinkai et al. |
| 5,343,796 A | * | 9/1994 | Cordova et al. ........... 89/36.02 |
| 5,471,906 A | | 12/1995 | Bachner, Jr. et al. |
| 5,565,264 A | | 10/1996 | Howland |
| 5,785,779 A | | 7/1998 | McGee et al. |
| 5,837,623 A | | 11/1998 | Howland |
| 5,976,996 A | | 11/1999 | Howland |
| 6,266,818 B1 | | 7/2001 | Howland |

FOREIGN PATENT DOCUMENTS

| | | |
|---|---|---|
| DE | 521174 | 3/1931 |
| DE | 539231 | 11/1931 |
| DE | 200 04 647 U1 | 3/2000 |
| EP | 0 569 891 A1 | 5/1993 |
| EP | 0 962 313 A1 | 8/1999 |
| EP | 0 962 562 A1 | 8/1999 |
| JP | 5-5276 | 1/1993 |
| JP | 9-105059 | 4/1997 |
| WO | WO 01/29299 A3 | 4/2001 |

* cited by examiner

Primary Examiner—John J. Calvert
Assistant Examiner—Robert H Muromoto, Jr.
(74) Attorney, Agent, or Firm—Maine & Asmus

(57) ABSTRACT

Puncture-resistant fabric layers such as a fabric layer with a high cover factor woven fabric having a fill yarn cover factor of at least about 75% of full and a warp yarn cover factor of at least about 100% of full formed of fill yarns and warp yarns, wherein the weight per unit length of the fill yarns is less than the weight per unit length of the warp yarns. Some embodiments have high tenacity fibers having a tensile breaking strength of at least about 10 g/Denier. Techniques for forming light weight yarns with high tenacity fibers for the small fill yarns and/or warp yarns. The high cover factor, small fill yarn-constructed woven fabrics can have natural and/or synthetic fibers with a tensile breaking strength less than about 10 g/Denier.

51 Claims, 9 Drawing Sheets

WOVEN FABRIC CONSTRUCTIONS HAVING HIGH COVER FACTORS AND FILL YARNS WITH A WEIGHT PER UNIT LENGTH LESS THAN THE WEIGHT PER UNIT LENGTH OF WARP YARNS OF THE FABRIC

RELATED APPLICATIONS

This non-provisional application claims the benefit under Title 35, U.S.C. §119(e) of co-pending U.S. provisional application Ser. No. 60/229,242, filed, Aug. 30, 2000, incorporated herein by reference.

FIELD OF THE INVENTION

The present invention is directed to woven fabrics that are densely woven to have high warp yarn and fill yarn cover factors and that include fill yarns having a weight per unit length less than the weight per unit length of warp yarns of the woven fabric, and more specifically, to the use of such fabrics as puncture-resistant layers in the construction of sportswear and rugged outerwear.

BACKGROUND OF THE INVENTION

A wide variety of natural and synthetic fabrics are known in the prior art for constructing sportswear, rugged outerwear, protective clothing, etc. (for example, gloves, aprons, chaps, pants, boots, gators, shirts, jackets, coats, socks, shoes, undergarments, vests, waders, hats, gauntlets, etc.). Typically, vestments designed for use as rugged outerwear have been constructed of relatively loosely-woven fabrics made from natural and/or synthetic fibers having a relatively low strength or tenacity (for example, cotton, polyesters, polyacrylics, polypropelene, etc.), with each fiber having a tensile strength or tenacity of less than about 8 grams g/Denier (gpd)), more typically less than about 5 gpd, and in some cases below about 3 gpd. While such materials can have a variety of beneficial properties, for example, dyeability, breathability, lightness, comfort, and in some instances, abrasion-resistance, such low-strength, low cover materials typically have poor puncture, tear, and cut resistance. Although the fabric design has a great deal to do with the performance of the materials.

In addition, a variety of high-strength materials for producing yarns and fabrics have also been employed in the prior art for applications involving ballistic armor, industrial, military, or law enforcement protective gear, and the like to provide enhanced puncture, cut, and tear resistance. Such materials have typically been fabricated from continuous filament yarns consisting of filaments of polymeric materials having a tensile strength or tenacity greater than about 10 g/Denier, and more typically greater than 15 g/Denier (referred to hereinafter as "high strength," "high tensile strength," "high tenacity," or "performance" materials or fibers). One popular class of polymers for producing such fabrics are the para-aramids, for example, KEVLAR™, TWARON™, and TECHNORA™. Other examples of high strength materials utilized in the prior art for fabricating ballistic and protective fabrics include liquid crystal polyesters (e.g. VECTRAN™), ultra-high molecular weight polyethylenes (e.g. SPECTRA™), and poly (p-phenylene-2,6-benzobisoxazole) (PBO)(e.g. ZYLON™). However, fabrics fabricated from such high-strength materials have typically been limited in use to industrial, military, or police applications involving the formation of puncture-resistant and/or antiballistic devices, shields, body armor, and similar articles. The fabrics constructed from the above-mentioned high strength materials have not been typically employed for fabricating articles of clothing for use as rugged outerwear or sportswear, for example, for use in clothing and other articles of apparel designed for activities such as hiking, hunting, fishing, gardening, participation in contact sports, etc.

There are a variety of reasons why puncture-resistant materials constructed from the above-mentioned high strength materials in forms in which they are typically available have not been typically employed in fabrication of rugged outerwear and other vestments designed and produced for use as casual, sporting, or outdoor outerwear. To begin with, each of the above-mentioned materials tends to be difficult or essentially impossible to dye, color, or print effectively, thereby substantially limiting the color and design options of the articles of apparel constructed from such materials. In addition, the above-mentioned materials, while having outstanding tensile strength characteristics, often have relatively poor abrasion resistance, which is undesirable in articles of clothing designed for use as rugged outerwear or sportswear. Also, filaments of such materials can be difficult to form into small diameter, light weight yarns. Typical yarn sizes commercially available greatly exceed the size and weight of commercially available yarns formed of natural or synthetic non-high tenacity materials, thereby limiting the ability to form lightweight woven fabrics and articles of apparel from such commercially available high tenacity yarns. Finally, the above-mentioned high tenacity materials tend to be very expensive and more difficult to process and weave into fabrics having characteristics desirable or suitable for use as rugged outerwear (with the notable exception of high puncture, cut, and tear resistance) than the more typically employed natural and/or synthetic materials mentioned above having a lower tensile strength.

There remains a need in the art to provide fabrics, fabric systems, and yarns/fiber bundles useful and economical for constructing rugged outerwear and recreational articles of apparel having a higher degree of puncture, tear and cut resistance than typically available, which puncture, tear and cut resistance is useful to prevent against injury to a wearer due to typically-encountered assaults while participating in use of outerwear, for example, exposure to thorns, snake bite, sharp branches, etc., while also maintaining certain, or essentially all, of the desirable properties of currently-employed non-high tenacity fiber-based fabrics, for example, dyability, printability, comfort, abrasion resistance, low cost, softness, quietness, breathability, light weight, etc. The present disclosure describes inventive fabrics, fabric constructions, and fabric systems, which can, in certain embodiments include one or more high tenacity fiber types, providing enhanced puncture, cut, and/or tear resistance, while also retaining some or all of the desirable aesthetic, comfort, and wearability characteristics of conventional rugged outerwear fabrics

SUMMARY OF THE INVENTION

The present disclosure describes puncture-resistant fabric layers comprising woven fabrics with unique, densely-woven structures. For example, such a fabric layer ca comprise a high cover factor woven fabric having a fill yarn cover factor of at least about 75% of full and a warp yarn cover factor of at least about 100% of fall formed of a plurality of fill yarns and a plurality of warp yarns, wherein the weight per unit length of the fill yarns is less than the weight per unit length of the warp yarns. Such constructions can, in some embodiments, consist essentially of high tenacity fibers having a tensile breaking strength of at least about 10 g/Denier. Such high cover, small fill yarn constructions enable the disclosed fabrics to be woven to have a decreased overall weight per unit surface area and an improved tensile balance, when compared to known high cover factor, densely woven fabric constructions. Also disclosed are various techniques for forming light weight yarns comprising or consisting essentially of high tenacity fibers for forming the small fill yarns and/or warp yarns of the high cover factor, small fill yarn-constructed fabrics disclosed. The high cover factor, small fill yarn-constructed woven fabrics can, in some embodiments, comprise or consist essentially of natural and/or synthetic fibers having a tensile breaking strength less than about 10 g/Denier, yielding densely woven fabrics with improved puncture, cut, and tear resistance when compared to fabrics formed of the same materials but with conventional woven constructions.

In one aspect, a variety of articles are disclosed. In one embodiment, an article comprising a plurality of fill yarns, having a weight per unit length of a first value, and a plurality of warp yarns, having a weight per unit length of a second value greater than the first value is disclosed. The fill yarns and the warp yarns are woven to form a fabric having a fill yarn cover factor of at least about 75% and a warp yarn cover factor of at least about 100%.

In another embodiment, an article comprising a plurality of fill yarns and a plurality of warp yarns woven to form a fabric having a fill yarn cover factor of at least about 75% and a warp yarn cover factor of at least about 100% is disclosed. At least one of the plurality of yarns forming the fabric comprises at least one fiber bundle formed of spun staple fibers and having a primary twist multiplier of at least about 2.7.

In yet another embodiment, an article comprising a plurality of fill yarns and a plurality of warp yarns woven to form a fabric having a fill yarn cover factor of at least about 75% and a warp yarn cover factor of at least about 100% is disclosed. At least one of the plurality of yarns forming the fabric is a plied yarn comprising at least two fiber bundles plied together and having a secondary twist of at least about ¼ that of the primary twist of the fiber bundles.

In another aspect, a series of methods are disclosed. In one embodiment, a method is disclosed comprising the step of weaving together a plurality of fill yarns, having a weight per unit length of a first value, and a plurality of warp yarns, having a weight per unit length of a second value greater than the first value, to form woven fabric having a fill yarn cover factor of at least about 75% and a warp yarn cover factor of at least about 100%.

In another embodiment, a method is disclosed comprising the step of weaving together a plurality of fill yarns and a plurality of warp yarns to form a fabric having a fill yarn cover factor of at least about 75% and a warp yarn cover factor of at least about 100%, wherein at least one of the plurality of yarns forming the fabric comprises spun staple fibers coated with a sizing agent prior to or during weaving.

In yet another embodiment, a method is disclosed comprising the step of weaving together a plurality of fill yarns and a plurality of warp yarns to form a fabric having a fill yarn cover factor of at least about 75% and a warp yarn cover factor of at least about 100%, wherein at least one of the plurality of yarns forming the fabric comprises at least one fiber bundle formed of spun staple fibers and has a primary twist multiplier of at least about 2.7.

In another embodiment, a method is disclosed comprising the step of weaving together a plurality of fill yarns and a plurality of warp yarns to form a fabric having a fill yarn cover factor of at least about 75% and a warp yarn cover factor of at least about is 100%, wherein at least one of the plurality of yarns forming the fabric comprises at least two fiber bundles plied together to have a secondary twist of at least about ¼ that of the primary twist of the fiber bundles.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
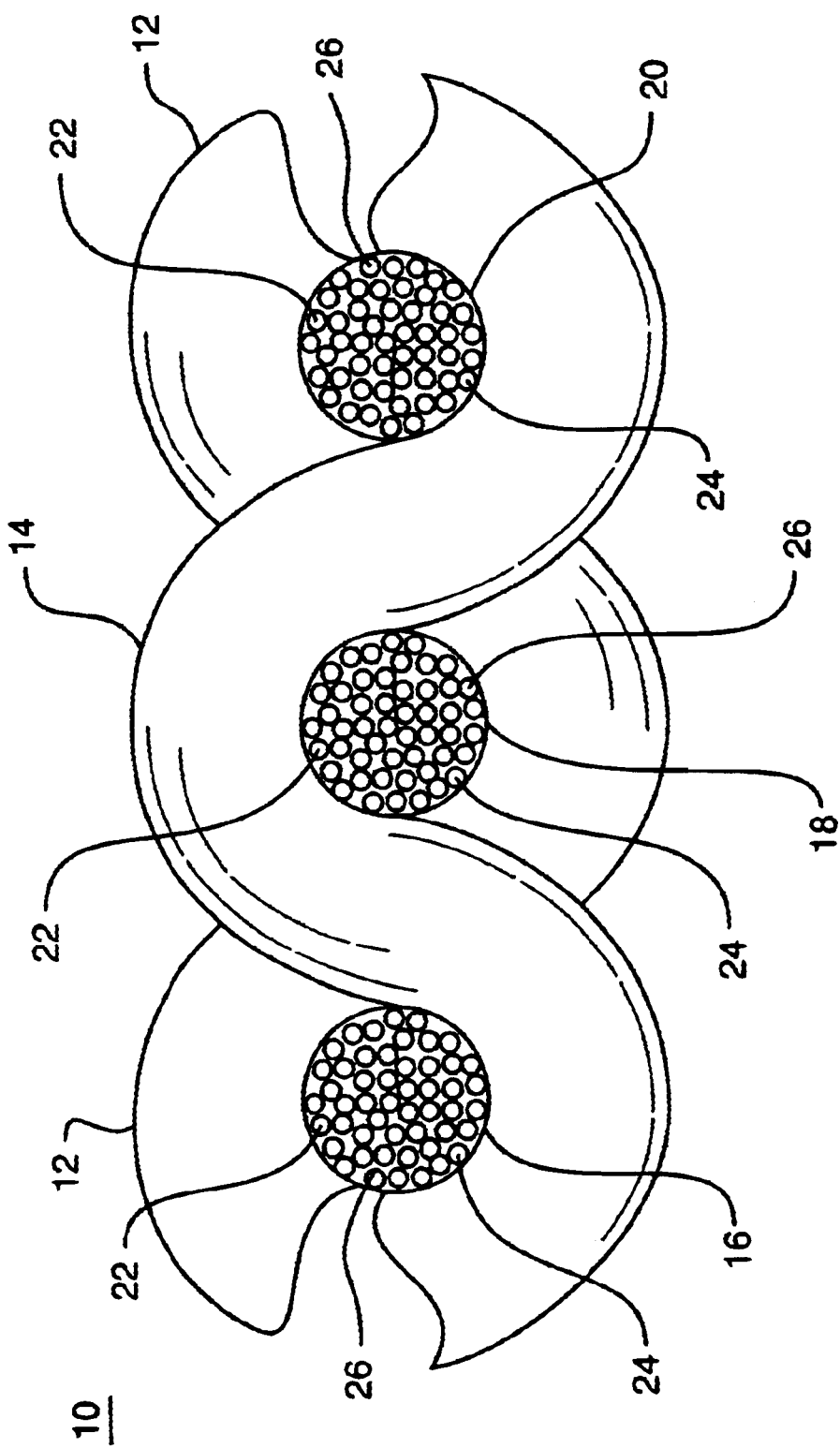
FIG. 1 shows a schematic, cross-sectional illustration of an intimate blend woven fabric, sectioned along the warp direction, according to one embodiment of the invention.

The present disclosure describes a variety of fabric systems and novel fabrics, yarns, and fiber bundles for use in forming protective fabrics, especially for use in applications such as sporting apparel and rugged outerwear. The below disclosed fabrics and fabric systems each, preferably, include a puncture, cut, and tear resistant layer (hereinafter referred to as a "puncture-resistant layer) providing protection against commonly encountered hazards, such as thorns, branches, snake bite, sharp rocks, etc. A variety of inventive solutions to the above-mentioned need in the prior art to provide fabrics and fabric systems able to provide enhanced puncture, cut, and tear resistance (for example, similar or essentially identical to that provided by industrial fabrics and materials consisting of high tenacity fibers), while maintaining one or more desirable properties of outerwear fabricated from traditional materials for fabricating such fabrics, such as natural fibers and/or low tenacity synthetic (e.g. dyeability, printability, soft hand, breathability, light weight, abrasion resistance, etc.). In one aspect, the disclosure describes protective fabric layers formed from intimate blends of two or more different fiber types. As discussed below, in certain preferred embodiments, such intimate blend fabrics preferably include at least one fiber type that is a high tenacity fiber having a tensile breaking strength of at least about 10 g/Denier and also include at least one other fiber type that is a non-high tenacity (i.e. with a tensile breaking strength less than about 10 g/Denier) natural or synthetic fiber, for example of the type traditionally employed in the manufacture of rugged outerwear (e.g., cotton, polyester, polyacrylic, polyolefin, etc.). As discussed in more detail below, such intimate blend fabrics can combine the beneficial attributes of each of the fibers comprising the intimate blend to produce, for example, an intimate blend fabric having an increased level of puncture, cut, and tear resistance, while maintaining one or more of the above-mentioned desirable properties of the non-high tenacity fiber-based fabrics.

In another aspect, the disclosure describes puncture-resistant fabric layers comprising woven fabrics with unique woven structures. For example, in one embodiment, such a fabric layer comprises a high cover factor (defined below) woven fabric comprising a plurality of fill yarns and a plurality of warp yarns, wherein the weight per unit length (in Denier) of the fill yarns is less than that of the warp yarns, or, equivalently, the of the length per unit weight (for example, in Cotton Count or Worsted Count) of the fill yarns is greater than that of the warp yarns. Such a construction is particularly preferred for fabrics consisting essentially of high tenacity fibers. Such high cover, small fill yarn construction enables such fabrics to be woven to have a decreased overall weight per unit surface area and improved tensile balance (explained below). Also disclosed within the context of this aspect of the invention are various preferred techniques for forming lightweight yarns consisting essentially of high tenacity fibers for comprising the small fill yarns and/or warp yarns of the above-described small fill, high cover factor woven fabrics. In other embodiments, beneficial attributes of both the intimate blend fabrics and the high cover and/or small fill woven construction can be combined, or, alternatively, the high cover, small fill construction can be utilized with non-high tenacity fibers to improve the tightness of the weave and puncture, cut, and tear resistance of fabrics woven from yarns consisting of non-high tenacity fibers.

In yet another aspect, the disclosure describes a variety of embodiments of layered and laminated fabric systems, each, preferably, including a puncture-resistant layer, preferably comprising or consisting essentially of high tenacity fibers, in combination with one or more additional layers providing one or more desirable attributes of an article of apparel for use in, for example, rugged outerwear (e.g., dyeability, printability, soft hand, breathability, abrasion resistance, etc.). In such embodiments, puncture-resistant layers comprising intimate blends and/or high cover/small fill fabrics, as described above and in more detail below, can be utilized, or, in other embodiments, other novel and/or conventionally constructed puncture-resistant layers can be utilized in combination with one or more additional layers to achieve an overall system having a desirable set of performance properties.

Finally, as described in more detail below, many of the above-mentioned novel fabrics and fabric systems comprising or consisting essentially of high tenacity fibers can have an improved ability to be dyed and/or printed with a printed pattern (e.g., as one example, a camouflage pattern), when compared to typical high tenacity fabrics known in the prior art. Also disclosed is a method for pre-washing fabrics comprising or consisting essentially of high tenacity fibers in order to improve the level of cut, puncture, or tear resistance of the fabrics, subsequent to the prewash and before assembly of the fabrics into articles of apparel.

Intimate Blend Fabrics, Yarns, and Fiber Bundles

The present invention provides a number of intimate blend fabrics useful for applications involving articles of apparel utilized for rugged outerwear and sporting wear, in which improved puncture, cut, and tear resistance is desired over typical articles of apparel for such purposes known in the prior art. An "intimate blend fabric" as used herein refers to a fabric including therein at least two different types of fibers, and in some instances a plurality of different types of fibers, wherein the different types of fibers are each present in a single layer of the fabric (or in at least one single layer of the fabric system for fabric systems having multiple layers), such that each fiber type is in direct and intimate contact with fibers of at least one other type within the fabric layer. An "intimate blend" yarn or fiber bundle, similarly refers to a yarn or fiber bundle including therein at least two different types of fibers, and in some instances a plurality of different types of fibers, such that each fiber type is in direct and intimate contact with fibers of at least one other type within the yarn or fiber bundle.

The term "fiber" as used herein refers to an elongate, individual and essentially monolithic unit of matter, either natural or synthetic, that forms the basic element of a fabric. The term "filament" as used herein refers to a fiber of an indefinite or extreme length. The term "staple fiber" as used herein refers to fibers having a shorter length (less than about 40 inches and typically between about 1 inch and about 4 inches), such fibers either normally having such a length (e.g. many natural fibers) or being cut or stretch broken from filaments. A "fiber bundle" as used herein refers to a plurality of fibers and/or filaments grouped together to form a multi-fiber strand bundle. A "yarn" as used herein refers to any continuous strand of fibers or filaments in a form suitable for knitting, weaving, or otherwise intertwining to form a textile fabric including, but not limited to: a number of fibers twisted together into a single fiber bundle (single ply spun yarn); a number of filaments laid together without twist (a zero-twist yarn); a number of filaments laid together with a degree of twist; a single filament with or without twist (a monofilament yarn); and two or more fiber bundles twisted together (a plied yarn or multi-ply yarn). A "woven fabric" as used herein refers to a fabric characterized by intersecting warp and fill yarns interlaced so that they cross each other at essentially right angles, the term including, but not limited to, well known woven structures such as plain weave (including variations thereof such as basket weaves), twill weaves, and satin weaves.

As one example, in one construction, an intimate blend fabric can comprise a woven fabric having a plurality of fill yarns and a plurality of warp yarns, wherein at least one of the fill yarns comprises fibers of a first type and wherein at least one of the warp yarns comprises fibers of a second fiber type. In such constructions, a variety of possibilities for weaving together fill yarns and warp yarns formed of the first and second fiber types, respectively, is possible; for example, each of the fill yarns can consist essentially of fibers of the first type and each of the warp yarns can consist essentially of fibers of the second type. Alternatively, yarns consisting essentially of fibers of the first type and yarns consisting essentially of fibers of the second type can be alternated in each of the warp and fill directions such that some yarns of the fill are yarns consisting essentially of fibers of the first type, other yarns of the fill are yarns consisting essentially of fibers of the second type, some yarns in the warp are yarns consisting essentially of fibers of the first type and other yarns in the warp are yarns consisting essentially of fibers of the second type. In such a configuration the yarns could individually alternate, be grouped into groups of two, three, four, etc., or be interwoven in any other of the wide variety of possible permutations, which would be readily envisioned by those of ordinary skill in the art.

In other embodiments, the fabric can comprise a woven fabric, in which some, or each, of the yarns in one or both of the fill and warp directions can comprise a plied yarn formed of two or more individual fiber bundles twisted together to form the plied yarn. In such embodiments, an intimate blend fabric can be formed by forming one or more of a first fiber bundle comprising or consisting essentially of fibers of a first type with one or more of a second fiber bundle comprising or consisting essentially of fibers of a second type into an intimate blend plied yarn, which is subsequently woven to form the intimate blend fabric. As should be readily understood, for intimate blends involving more than two types of fibers, in each of the above-mentioned constructions additional yarns and/or fiber bundles including a third, fourth, fifth, etc. fiber type could be included and blended together and/or with the above-mentioned yarns and fiber bundles to form a more complex intimate blend fabric.

In one particularly preferred embodiment, the intimate blend fabrics are produced from a plurality of yarns, at least one of which, and preferably at least each of those in the warp or fill direction (in a woven fabric), or in other embodiments, each of which in both the warp and fill directions, are formed of fiber bundles that comprise fibers of at least a first fiber type and a second fiber type. In such embodiments, the fiber bundles themselves, which form or are used to form one or more of the yarns utilized to construct the fabric layer, for example by weaving, can comprises an intimate blend of two or more different fiber types.

As discussed in more detail below, preferred embodiments of the intimate blend fabrics involve fabric layers constructed of two or more different types of fibers, most preferably where at least one fiber type is a high tenacity fiber having a tensile breaking strength of at least about 10 g/Denier and at least one other fiber type is a natural or synthetic fiber having a tensile breaking strength of less than about 10 g/Denier. In preferred embodiments, the non-high tenacity fibers are selected based on their possessing one or more desirable properties, for example, dyability, printability, softness, flexibility, the ability to improve the spinnability of staple fibers into fiber bundles/yarns, etc.

"High tenacity fibers" as used herein are those having a tensile breaking strength of at least about 10 g/Denier, more preferably at least about 15 g/Denier, in some embodiments at least about 20 g/Denier, in other embodiments at least about 25 g/Denier and in yet other embodiments at least about 30 g/Denier. Such high tenacity fibers are known in the art, but have typically been limited in use to industrial protective articles or antiballistic material. In addition, typically fabrics made from such materials have been made essentially entirely from fibers consisting essentially of the high tenacity materials. In addition, woven fabrics made from such materials have typically been woven from yarns comprising fibers in the form of continuous filaments formed of the high tenacity materials. An exemplary list of high tenacity fibers useful in the context of the present invention includes, but is not limited to, fibers formed of para-aramids (e.g., KEVLAR™, TWARON™, and TECHNORA™), liquid crystal polyesters (e.g., VECTRAN™), ultra high molecular weight polyethylenes (e.g., SPECTRA™), and poly (p-phenylene-2,6-benzobisoxazole)(PBO) (e.g., ZYLON™).

"Non-high tenacity fibers" as used herein are natural or synthetic fibers having a tensile breaking strength of less than about 10 g/Denier, preferably less than about 8 g/Denier, in some embodiments less than about 5 g/Denier, and in yet other embodiments less than about 3 g/Denier. Potentially useful non-high tenacity fibers within the context of the present invention include, but are not limited to, fibers formed of materials such as polyarnides (e.g., nylon), cellulosic materials (e.g., cotton), polyesters, acrylic polymers, and polyolefins. An exemplary, but non-limiting, list of articles of apparel and rugged outerwear that can be advantageously constructed from the intimate blend fabric layers provided according to the invention include, for example, gloves, aprons, chaps, pants, boots, gators, shirts, jackets, coats, socks, shoes, undergarments, vests, waders, hats, gauntlets, etc.

As mentioned above, one important purpose for including high tenacity fibers in some intimate blend fabrics according to the invention is to increase the puncture, cut, and/or tear resistance of materials used for rugged outerwear/sportswear, when compared to fabrics made of the non-high tenacity materials typically employed in the prior art. Accordingly, while, in some embodiments, the intimate blends can comprise non-woven fabrics, for example, knitted or felted fabrics (felts), in preferred embodiments the intimate blend fabric layers comprise a woven fabric, and in some preferred embodiments comprise a tightly woven fabric having a high cover factor. In preferred embodiments, an intimate blend woven layer provided according to the invention has a fill yarn cover factor (explained below) of at least about 75% of full and a warp yarn cover factor of at least about 100% of full, or a round packed (explained below) fill yarn cover factor of at least about 65% of full and a round packed warp cover factor of at least about 35% of full. A detailed description of the fabric geometry, calculation of various cover factors, and methods of construction of densely woven fabrics having high cover factors, as discussed herein, can be found in commonly owned U.S. Pat. Nos. 5,565,264 and 5,837,623, commonly owned International Patent Application Ser. No. PCT/US00/28796 having an International Publication Number of WO 01/29299, co-pending U.S. patent application Ser. No. 09/691,491, and U.S. Provisional Application Ser. No. 60/229,708, each incorporated herein by reference.

Any of the below described inventive fabric layers, including intimate blend fabric layers, can be used as single layers, be stacked and/or bonded into multiple layer structures, and/or can be layered/laminated with other fabric or non-fabric layers, for example a water impermeable, breathable membrane barrier layer, as discussed in more detail below. The inventive fabrics can also be coated with a variety of high or low modulus polymeric coatings to increase puncture, cut, and/or tear resistance. Such coatings and techniques for their application are described in detail in the above-mentioned commonly owned U.S. Pat. Nos. 5,565,264 and 5,837,623, commonly owned International Patent Application Ser. No. PCT/US00/28796 having an International Publication Number of WO 01/29299, and co-pending U.S. patent application Ser. No. 09/691,491.

A wide variety of well known weaving processes and equipment can potentially be utilized for forming the high cover factor, tightly woven fabrics, including the intimate blend fabrics, preferred according to some embodiments of the invention. Because the preferred fabrics are tightly or densely woven as described above and in more detail below, in order to improve weavability and decrease yarn breakage, in preferred embodiments, wherein yarns comprising spun or otherwise bundled staple fibers are utilized for forming the intimate blend fabrics according to the invention, it is preferred that the yarns be formed from more than one fiber bundle plied together with a relatively high level of secondary twist, as described below, and/or that the yarns be formed from single fiber bundles having a relatively high primary twist level, as also described below. In addition, the weavability of the yarns and fiber bundles disclosed herein (and/or the spinnability of the staple fibers to form fiber bundles/yars) can, in some cases, be improved by one or more of the following: increasing the length of the individual staple fibers; decreasing the size per unit length (Denier) of individual staple fibers used for spinning fiber bundles/yarns; forming intimate blend fiber bundles/yarns including staple fibers (e.g., cotton, or micro denier nylon or polyester staple fibers) which can improve the spinnability and integrity of the spun fiber bundles/yarns; and/or through use of any of a variety of well-known polymeric or non-polymeric sizing agents to stabilize and increase the mechanical integrity of the fiber bundles/yarns.

In general, the terms "tightly woven" or "high cover" or "high cover factor" as used herein to describe certain preferred embodiments of woven fabric layers refers to a fabric layer having a cover factor of at least about 75% of full in the fill (as measured between two warp ends) and a cover factor of at least about 100% in the warp (as measured at the center of the fill yarn where there can be effective overlap of the warp yarns on opposite sides of the fill yarn, thus leading to warp cover at the fill crossing potentially greater than 100% of full). "Cover factor" or "cover" as used herein, (except when modified by the prefix "round packed," see below) refers to the fraction, expressed as a percentage, of the total area of a fabric occupied by fibers as measured in the woven fabric. The above-mentioned cover factor is expressed as a percent of full coverage (i.e., 100% of the total area) occupied by yarns such as would occur if the yarns were laid out in a single layer, side by side, and in contact with each other). "Cover factor" as used herein can be calculated, for a unit length of fabric, as the sum of each of the measured widths of the yarns (see sentence below for a description of appropriate yarn width for warp and fill) in a given cross-section, divided by the total width of the fabric cross-section (see also U.S. Pat. No. 5,565,264). When calculating the cover factor in the warp, the appropriate yarn width utilized is simply the width of each warp yarn as measured at the fill crossing; however, when calculating the cover factor in the fill by this method, because there is a warp yarn positioned between each of the fill yarns due to the crimp in the woven structure, the effective yarn width which is used in the calculation is equal to the sum of the widths of a fill yarn and a warp yarn, as measured between the fill crossings In some preferred embodiments, the high cover fabrics, including high cover intimate blend fabrics, are densely woven to have a fill yarn cover factor of at least about 80%, in other embodiments at least about 85%, and in yet other embodiments at least about 88%. In certain preferred embodiments, the high cover fabrics, including high cover intimate blend fabrics, are densely woven to have a warp yarn cover factor of at least about 110%, in other embodiments at least about 120%, in other embodiments at least about 130%, in other embodiments at least about 140%, in other embodiments at least about 145%, and in yet other embodiments at least about 150%.

An alternative way of calculating and expressing the weave density of the woven fabrics used herein is by determining the degree of surface area occupied based on the "round packed cover factor." The "round packed cover factor" as used herein refers to a measure of cover calculated as discussed immediately below. The round packed cover factor is calculated essentially as described in the above paragraphs, except instead of using the actual measured yarn widths in the woven fabrics in the calculation, the width of a hypothetical round cross-section monofilament yarn of the same overall weight per unit length (Denier) is used. To determine the appropriate yarn diameter, the weight per unit length of the actual yarn is divided by the density or specific gravity of the material forming the yarn fibers (or an appropriate average density/specific gravity for a yarn comprising more than one fiber type) and the diameter is then calculated from the resulting cross-sectional area by assuming the yarn is a single filament with a round cross-section. The "round packed cover factor" is then determined as number of yarns in a cross-section of a given length of fabric multiplied by the width/diameter per yarn, as calculated above, divided by the length of the cross-section. This calculation is done for both the warp and fill directions. As above, the appropriate fill yarn width/diameter for this calculation should be based upon the sum of the width/diameter of a warp yarn plus a fill yarn. Note that the maximum theoretical round packed cover factor as calculated above would be 100% of full (i.e. when the number of yarns per unit length is high enough that the hypothetical yarns (i.e. with a diameter based on the round shape/monofilament assumption) when laid out side-by-side in a single layer would be in contact with their neighbors. A "high cover factor" fabric as the term is used herein can also be characterized by a round packed cover factor of at least about 65% of full for the fill yarns and at least about 35% of full for the warp yarns.

In some preferred embodiments, the high cover fabrics, including high cover intimate blend fabrics, are densely woven to have a round packed fill yarn cover factor of at least about 70%, in other embodiments at least about 80%, in other embodiments at least about 90%, and in yet other embodiments at least about 95%. In certain preferred embodiments, the high cover fabrics, including high cover intimate blend fabrics, are densely woven to have a warp yarn round packed cover factor of at least about 40%, in other embodiments at least about 50%, in other embodiments at least about 60%, and in yet other embodiments at least about 70%.

Referring now to FIG. 1, a woven fabric 10 is illustrated comprising a plurality of warp yarns 12, 14 interwoven with a plurality of fill yarns 16, 18, 20. In the illustrated embodiment, each of the fill yarns and warp yarns comprises a single fiber bundle formed of a plurality of staple fibers and having a predetermined level of primary twist. In other embodiments, especially for embodiments where one or more yarns in the fill and/or warp direction is formed entirely of high tenacity fibers, such yarns could comprise untwisted fiber bundles including fibers in the form of essentially continuous filaments.

As discussed above, there are many permutations for providing an intimate blend woven fabric according to one aspect of the invention. For example, in one embodiment, the fiber bundles comprising warp yarns 12 and 14 can consist essentially of fibers of a first fiber type, while fiber bundles forming fill yarns 16, 18, 20 can consist essentially of fibers of a second fiber type. Alternatively, yarns consisting essentially of fibers of a first fiber type and yarns consisting essentially of fibers of a second fiber type can be woven in essentially any pattern or combination (e.g., yarns 12 and 18 of the first fiber type with yarns 14, 16, 20 of the second fiber type; yarns 12 and 18 of the first fiber type with yarns 14, 16, 20 of the second fiber type, etc.). In addition, in other embodiments, the intimate blend fabric can be formed from more than two different types of fibers, for example from a plurality of yarns including yarns consisting essentially of or comprising a first, second, third, fourth, fifth, etc. fiber type, etc.

In some embodiments, and preferably, at least one of the yarns includes at least one fiber bundle comprising fibers of at least a first fiber type and a second fiber type (and, if desired, a third, fourth, fifth, etc. fiber type). Such intimate blend fiber bundles and yarns can be interspersed with other intimate blend yarns of the same or different fiber composition and/or with yarns consisting essentially of fibers of a single fiber type, depending on the desired material properties of the overall fabric. In some preferred embodiments, each of the yarns forming the intimate blend fabrics is itself comprised of one or more fiber bundles, each of which can be an intimate blend of at least two different fiber types.

As one example, fabric 10 illustrated in FIG. 1 can comprise warp yarns 12, 14 consisting essentially of spun cotton staple fibers and fill yarns 16, 18 and 20, each comprising an intimate blend of spun staple fibers including high tenacity para-aramid staple fibers 22, cotton staple fibers 24, and polyester staple fibers 26.

For intimate blend fabrics, such as 10, including one or more intimate blend fiber bundles comprising one or more fibers formed of a high tenacity material, in order to impart desirable penetration, tear, and/or cut resistance to the fabric formed from yarns formed from such fiber bundles, it is preferred that at least about 5% of the fibers in the intimate blend fiber bundle be high tenacity fibers, more preferably at least about 15%, more preferably at least about 25%, more preferably at least about 50%, more preferably at least about 65%, in other embodiments at least about 75%, and in yet other embodiments at least about 85%. In addition, if desired, an intimate blend fiber bundle can comprise more than one type of fiber, with each type being formed of a different high tenacity material having a tensile breaking strength of at least about 10 g/Denier.

Figure 3B:
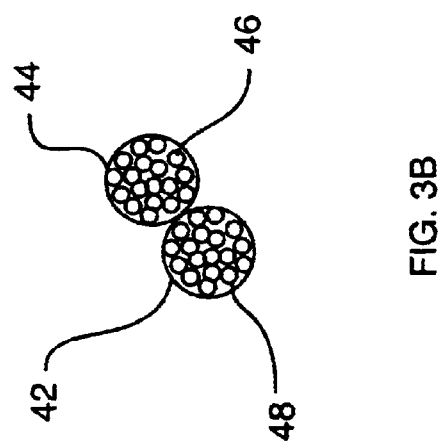
FIG. 3B shows a cross-sectional illustration of the yarn of FIG. 3A sectioned along line B—B.
Figure 3A:
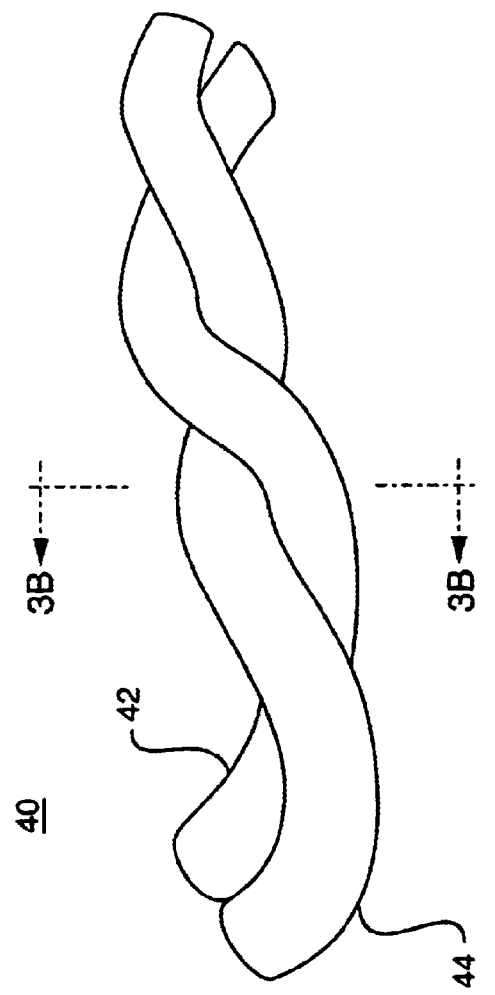
FIG. 3A shows a schematic, perspective illustration of a two-ply intimate blend yarn according to one embodiment of the invention.

Essentially, any of the well known methods for spinning cut and/or stretch-broken staple fibers can potentially be utilized for producing spun yarns/fiber bundles, including intimate blend yarns/fiber bundles, according to the invention. For example, for staple fibers having a staple length of between about 1 inch and about 2 inches, the well known Cotton System spinning techniques can be utilized to form twisted yarns comprising a single fiber bundle and/or plied yarns comprising two or more twisted fiber bundles. For staple fibers between about 2 inches and about 4 inches, the well known Worsted System spinning techniques can be utilized for forming the spun yarns/fiber bundles according to the invention. In addition, stretch broken staple fibers having very long staple lengths, e.g., about 20–40 inches, can also be used to form intimate blend yarns; however, the use of such long staple fibers is generally less preferred than the use of shorter staple fibers as in the above-mentioned Cotton and Worsted spinning systems when forming intimate blend fiber bundles. When using long stretch-broken staple fibers for forming intimate blend yarns, it is preferred that each fiber bundle consist essentially of essentially a single fiber type, with the intimate blend yarn formed of two or more such fiber bundles plied together to form a plied yarn (e.g., as illustrated in FIG. 3).

It is generally desirable when constructing articles of apparel for use as rugged outerwear that the woven fabrics utilized be formed of yarns having a relatively small weight per unit length and overall cross-sectional diameter, in order to enable the fabrics to be constructed with a desirably low weight per unit coverage surface area, a desirable degree of flexibility and softness, etc. However, typical prior art high tenacity fibers, either in continuous filament form or staple fiber form, cannot typically be successfully spun or formed into fiber bundles having a weight per unit length of less than about 100 Denier (for continuous filament yarns) or a length per unit weight of greater than about 50 Cotton Count (for yarns consisting essentially of spun high tenacity staple fibers). With respect to yarns formed of only high tenacity staple fibers spun using Cotton System spinning, a reason why yarns having a length per unit weight of greater than about 50 Cotton Count, or equivalently a weight per unit length of less than about 106 Denier, are not generally preferred for weaving fabric, especially high cover factor woven fabric, according to the invention, is that typical minimum Denier per fiber/filament of commercially available high tenacity fibers is relatively high, ranging typically form about 0.5 Denier per fiber to about 5 Denier per fiber. Accordingly, small diameter, light yarns that consist entirely of short staple lengths of such high tenacity fibers will typically have too few individual fibers present in a cross section of the yarn to enable the yarn to be successfully woven, especially densely woven into a high cover factor fabric, without failure of breakage of the yarn. Accordingly, it is advantageous, according to the invention, to form intimate blend fiber bundles from spun staple yarns that include fibers of high tenacity materials, as described above, in combination with staple fibers of other materials, for example, cotton, or low tenacity synthetic materials, which are available in fiber weights having a Denier per filament substantially below that typically available for high tenacity fibers. For example, in some preferred embodiments, high tenacity staple fibers are intimately blended with more spinnable fibers, for example micro denier polyester or nylon staple fibers or cotton, having a small Denier per filament and providing a higher level of interfiber shear than typical high tenacity-material fibers. By forming yarns/fiber bundles from high tenacity fibers in combination with such small, high interfiber shear-creating low tenacity fibers, the number of filaments in an intimate blend yarn/fiber bundle cross-section can be increased for a given yarn/fiber bundle weight and diameter, which, in turn, can lead to the ability to spin finer yarns/fiber bundles, especially when utilizing Cotton System spinning, and improve fabric weight, hand, softness, and overall performance.

In view of the above, to provide a tightly packed, mechanically stable yarn, for embodiments including one or more yarns comprising an intimate blend fiber bundle, and especially yarns comprising a single intimate blend fiber bundle, it is preferred that the yarn be characterized by a primary twist multiplier of at least about 2.7, in other embodiments of at least about 3, in other embodiments of at least about 4, in other embodiments of at least about 4.5, and in yet other embodiments of at least about 5. In some embodiments, for example those embodiments including yarns comprising an intimate blend fiber bundle having a fiber of a first type comprising a high tenacity material and a fiber of the second type comprising a low tenacity, non-high tenacity material, as discussed above, preferably, the fiber of the second type has a weight per unit length less than the fiber of the first type. Preferably, when forming intimate blend fiber bundles from spun staple fibers, as discussed above, the weight per unit length of the non-high tenacity fiber will be less than that of the high tenacity fiber. Also preferably, in some such embodiments, the weight per unit length of the high tenacity fiber does not exceed about 5 Denier per fiber, more preferably does not exceed about 2.5 Denier per fiber, even more preferably does not exceed about 1.5 Denier per fiber, in other embodiments does not exceed about 1 Denier per fiber, and in yet other embodiments does not exceed about 0.5 Denier per fiber. Also preferably, in some such embodiments, the non-high tenacity fiber intimately blended with the high tenacity fiber in the intimate blend fiber bundle has a weight per unit length that does not exceed about 1.2 Denier per fiber, more preferably does not exceed about 0.8 Denier per fiber, more preferably does not exceed about 0.5 Denier per fiber, more preferably does not exceed about 0.25 Denier per fiber, and more preferably does not exceed about 0.1 Denier per fiber.

In preferred embodiments, as discussed above, relatively small diameter, lightweight fiber bundles/yarns are desirable for forming the fabrics according to the invention. In some preferred embodiments, wherein the fabric includes one or more yarns formed of an intimate blend fiber bundle, such fiber bundle includes within any given cross-section of the fiber bundle along its length between about 60 and about 100 fibers. In preferred embodiments, the intimate blend fiber bundles formed of a plurality of spun staple fibers and used for forming at least some yarns of certain inventive fabrics have a length per unit weight exceeding about 50 Cotton Count and a weight per unit length less than about 106 Denier, in other preferred embodiments have a length per unit weight exceeding about 60 Cotton Count and a weight per unit length less than about 89 Denier, in other preferred embodiments have a length per unit weight exceeding about 70 Cotton Count and a weight per unit length less than about 76 Denier, in other preferred embodiments have a length per unit weight exceeding about 80 Cotton Count and a weight per unit length less than about 66 Denier, and in yet other preferred embodiments have a length per unit weight exceeding about 85 Cotton Count and a weight per unit length less than about 63 Denier.

Figure 2:
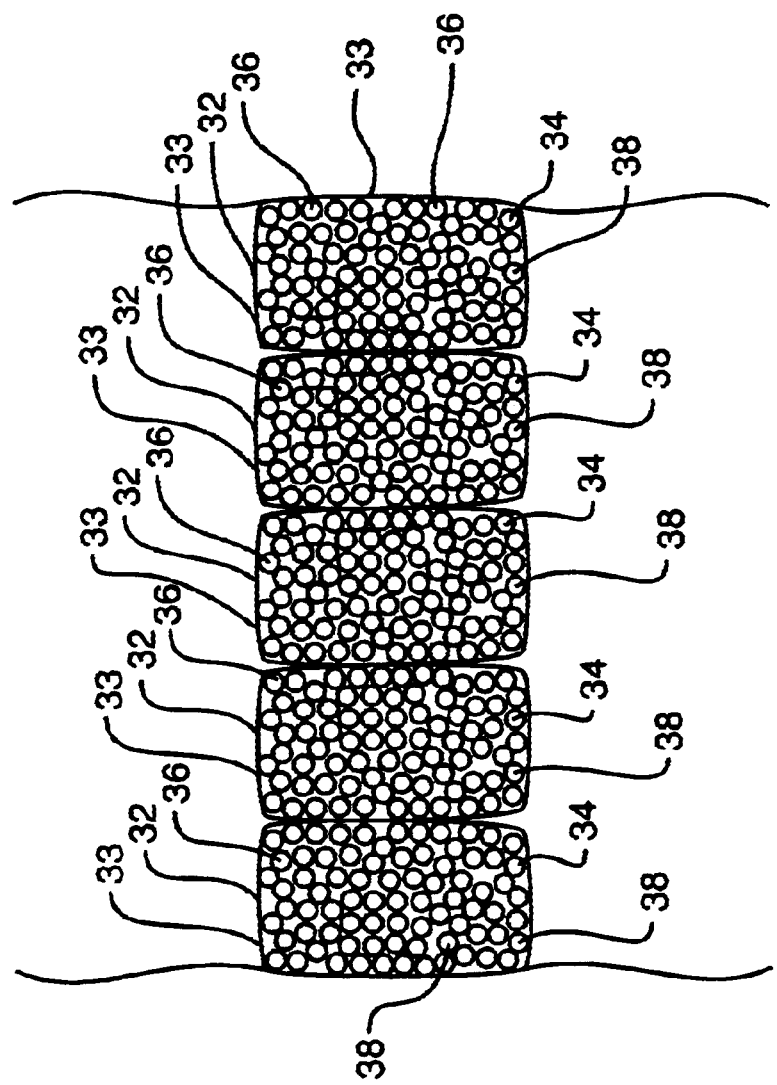
FIG. 2 shows a schematic, cross-sectional illustration of an intimate blend woven fabric, sectioned along the fill direction between fill picks, according to another embodiment of the invention.

Referring now to FIG. 2, tightly woven fabric 30 is illustrated as sectioned along the fill direction at a point between locations of fill yarn insertion. Fabric 30 comprises a plurality of warp yarns 32. In the particular embodiment illustrated, fabric 30 comprises a plurality of fill yarns (not shown) and a plurality of warp yarns, each of which is formed from single fiber bundles 33 comprising a plurality of spun staple fibers, and each of which is essentially identical to each other in overall composition. Specifically, in the embodiment illustrated, each of warp yarns 32, and, as well, the fill yarns (not shown) comprises an intimate blend fiber bundle 33 including staple fibers 34, which are formed from a high tenacity para-aramid, staple fibers 36, which are formed from a second high tenacity material, for example a liquid crystal polyester material, and staple fibers 38, which are formed of a non-high tenacity synthetic polymer, such as a polyamide, polyester, polyacrylic, or polyolefin.

Referring now to FIG. 3, an alternative construction for an intimate blend yarn 40 useful according to certain embodiments of the invention for forming intimate blend woven fabrics is illustrated. Yarn 40 comprises two fiber bundles 42 and 44, plied together to form plied yarn 40. Each of fiber bundles 42, 44 of plied yarn 40, in some preferred embodiments, has a weight per unit length of no greater than about 100 Denier, or for embodiments where fiber bundles 42 and 44 are formed of spun staple fibers, a length per unit weight of at least about 50 Cotton Count. In addition to the construction illustrated, in other embodiments, plied yarns can be constructed of more than two individual fiber bundles twisted together to form a plied construction including three or more intertwined fiber bundles. Plied yarns, such as plied yarn 40, can be advantageously employed for embodiments wherein one or more of the fiber bundles forming the plied yarn (e.g., 42 or 44) is formed of a very high percentage of high tenacity fibers (e.g., greater than 85%) having low inter-fiber shear or consists essentially of such high tenacity fibers. Alternatively, one or each of the plied fiber bundles forming the plied yarn can comprise an intimate blend fiber bundle including a high tenacity fiber type and a non-high tenacity fiber type.

For example, as illustrated in the cross-sectional view of FIG. 3, one or both of fiber bundles 42 or 44 can consist essentially of high tenacity staple fibers 46 while the other fiber bundle (42, as illustrated) can consist essentially of staple fibers 48 of a low tenacity, non-high tenacity material, or, a different high tenacity fiber than fiber 46 of fiber bundle 44. In some embodiments, it is preferred that the individual fiber bundles twisted to form the plied yarn be plied together to form the yarn with a secondary ply twist of at least about ¼ that of the primary twist of the fiber bundles, in other embodiments of at least about ½ that of the primary twist of the fiber bundles, and in other embodiments of at least about equal to that of the primary twist of the fiber bundles. In addition, as discussed above, in order to increase the mechanical stability and weavability of the fiber bundles and/or yarns comprising any of the woven fabrics provided according to the invention, the yarns and/or fiber bundles of the fabrics, and especially those utilized to form the warp yarns, which are subjected to greater weaving stresses during fabric construction, can be treated with a variety of well-known adhesive sizes, for example, including, but not limited to, polymers such as polyvinyl alcohol, polystyrene, polyacrylic acid, polyacetates, starches, etc.

High Cover Factor/Small Fill Yarn Fabrics

The present invention also provides woven fabric constructions for high cover factor woven fabrics yielding more lightweight and flexible fabrics than those typically available utilizing prior art woven constructions. Such constructions, as disclosed below, are particularly useful for forming woven fabrics from yarns consisting essentially of high tenacity fibers or filaments; however, such constructions can also be beneficial in the context of intimate blend fabrics, such as those discussed above, or high cover factor, densely woven fabrics consisting essentially of non-high tenacity fibers.

High cover factor woven fabrics formed from high tenacity para-aramid fibers and filaments are known from commonly owned U.S. Pat. Nos. 5,837,623 and 5,565,264. However, as described below, prior art constructions of high cover factor fabrics, and especially those formed of high tenacity fibers or filaments, are typically characterized by warp yarns that are smaller in size than the fill yarns of the fabrics (i.e., the weight per unit length of the warp yarns is less than the weight per unit length of the fill yarns or, equivalently, the length per unit weight of the warp yarns is greater than the length per unit weight of the fill yarns).

Figure 4A:
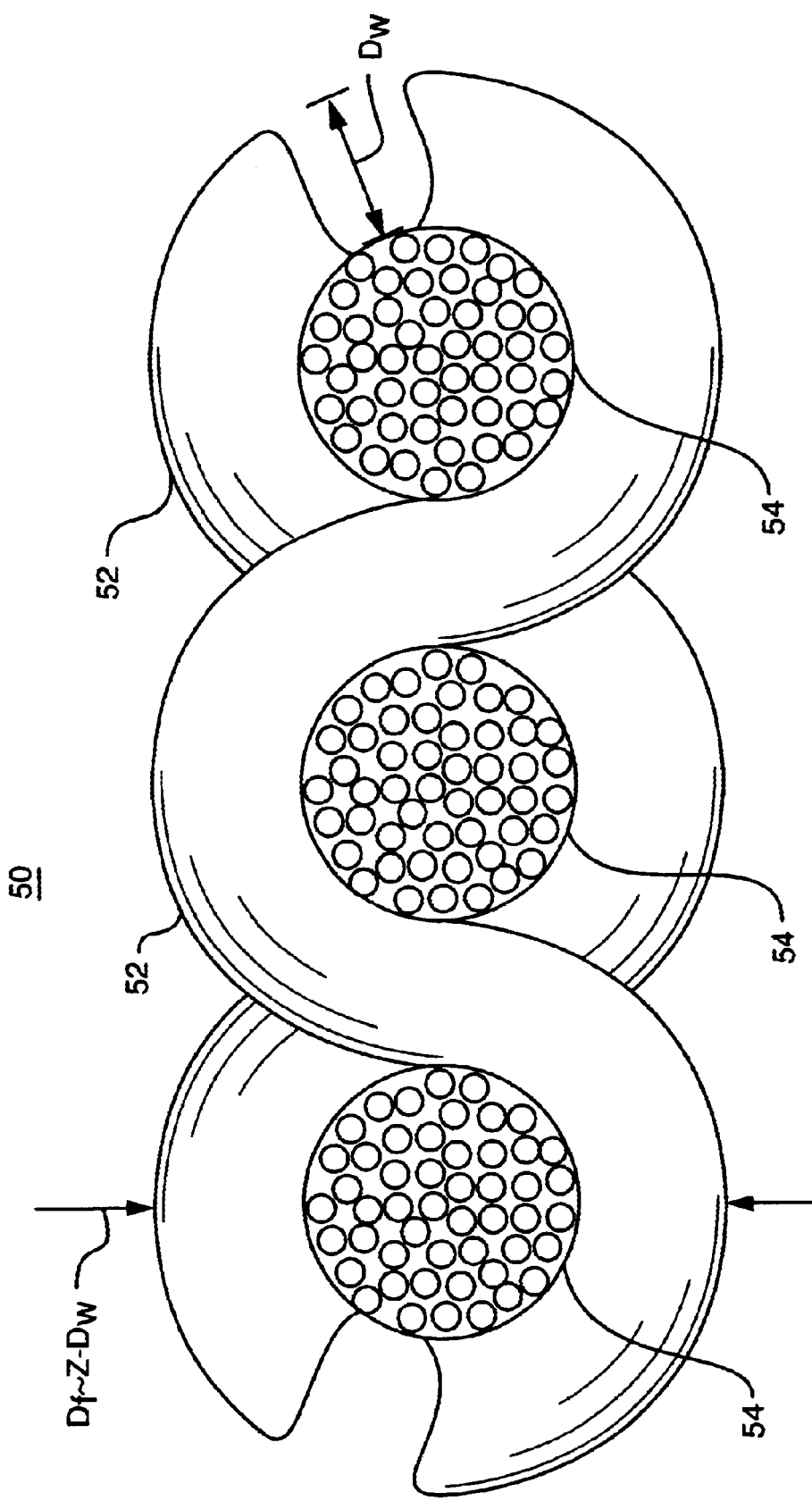
FIG. 4A shows a schematic, cross-sectional illustration of a prior art woven, high cover factor fabric having fill yarns with a weight per unit length exceeding the weight per unit length of the warp yarns.

FIG. 4a illustrates a prior art woven construction of a high cover factor fabric formed of a plurality of interwoven warp yarns 52 and fill yarns 54. In the illustrated embodiment, warp yarns 52 have a weight per unit length (Denier) approximately ½ that of fill yarns 54. In other words, for an embodiment where the warp yarns and fill yarns are formed of essentially the same fiber type (e.g., a high tenacity fiber type) the diameter of fill yarn 54 ($D_f$) will be approximately two times the diameter of warp yarn 52 ($D_w$).

Figure 4B:
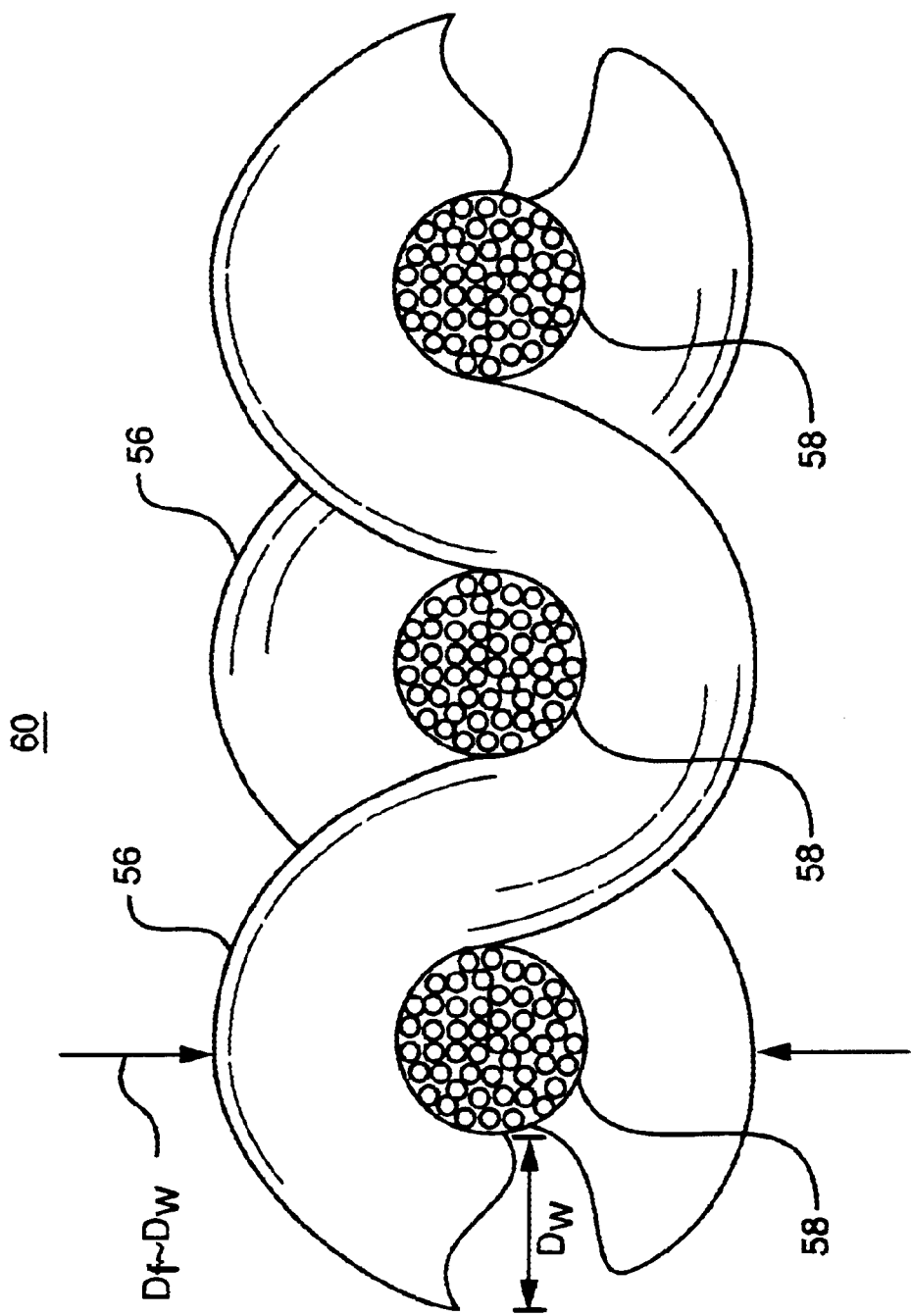
FIG. 4B shows a schematic, cross-sectional illustration of a prior art woven, high cover factor fabric having fill yarns with a weight per unit length approximately equal to the weight per unit length of the warp yarns.

FIG. 4b illustrates an alternative woven construction of a high cover factor woven fabric known in the prior art, in which the weight per unit length of the warp yarns and fill yarns are substantially equal. In the illustrated embodiment, warp yarns 56 have a weight per unit length (Denier) approximately equal to that of fill yarns 58. For example, for an embodiment wherein warp yarns 56 are constructed from essentially the same fiber material as fill yarns 58, the diameter of fill yarns 58 ($D_f$) will be approximately equal to the diameter of warp yarns 56 ($D_w$).

Figure 5:
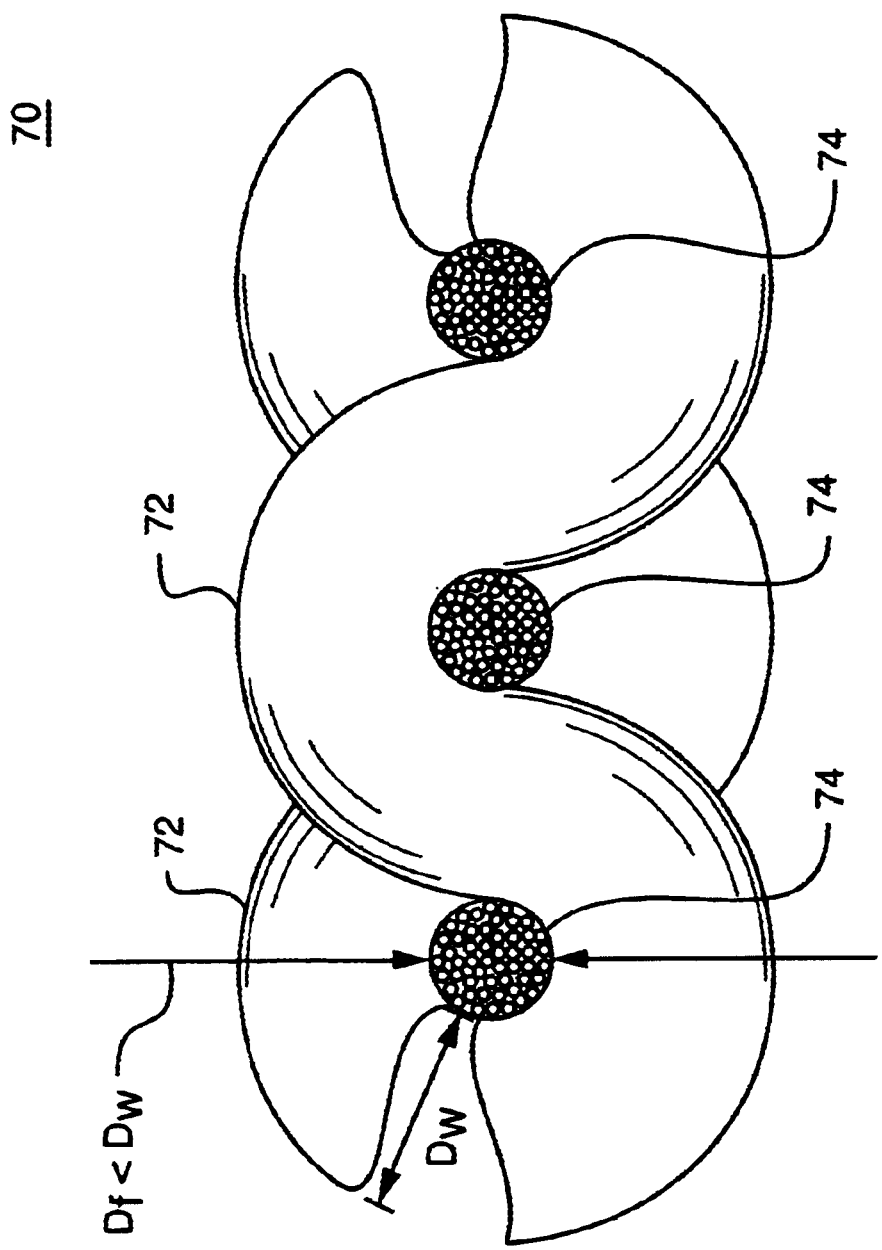
FIG. 5 shows a schematic, cross-sectional illustration of woven, high cover factor fabric having fill yarns with a weight per unit length less than the weight per unit length of the warp yarns, according to one embodiment of the invention.

FIG. 5 illustrates a fabric 70 having a woven construction provided according to one aspect and embodiment of the invention. Fabric 70 comprises a plurality of fill yarns 74 having a weight per unit length of a first value and a plurality of warp yarns 72 having a weight per unit length of a second value, which is greater than the first value. In preferred embodiments, the warp yarns and the fill yarns are woven to form a high cover factor fabric, i.e., one having a fill yarn cover factor of at least about 75% and a warp yarn cover factor of at least about 100%. It should be emphasized at this point that a measurement involving weight per unit length (in Denier) can be readily converted to a measurement involving length per unit weight (e.g., in Cotton Count or Worsted Count). In other words, and equivalently, a woven fabric constructed accordingly to the present aspect of the invention can also be characterized as having a plurality of fill yarns having a length per unit weight of a first value (e.g., as expressed in Cotton Count or Worsted Count) and a plurality of warp yarns having a length per unit weight of a second value less than the first value. In other words, weight per unit length as measured in Denier is proportional to the reciprocal of the length per unit weight as measured in either Cotton Count or Worsted Count. More specifically: Denier~5315/Cotton Count~7971/Worsted Count. As discussed above, weight per unit length in Denier is a common unit of measurement for continuous filament yarns and long fiber length stretch-broken yarns, length per unit weight in Cotton Count is a common unit of measurement for spun yarns formed using Cotton System spinning of staple fibers having a length of about 2 inches or less, and length per unit weight in Worsted Count is a common unit of measurement yarns spun using Worsted System spinning of staple fibers having a length of from about 2 inches to about 4 inches. It should be understood, since values related to the size of the yarns expressed in any of the above-mentioned units are readily convertible from one to the other, that any of the descriptions below and/or appended claims reciting a measurement in one system of units is also intended to cover such measurement/dimension expressed in the other unit systems.

In some preferred embodiments of the inventive fabrics having fill yarns with a weight per unit length less than the weight per unit length of warp yarns of the fabric, the fabric has a fill yarn cover factor of at least about 80%, in other embodiments at least about 85%, and in other embodiments at least about 88%. In some preferred embodiments, the fabric can have a warp yarn cover factor of at least about 110%, in other embodiments at least about 120%, in other embodiments at least about 130%, in other embodiments at least about 140%, in other embodiments at least about 145%, and in yet other embodiments at least about 150%.

In some preferred embodiments, the weight per unit length of fill yarns 74 does not exceed about 400 Denier, in other embodiments does not exceed about 200 Denier, in other embodiments does not exceed about 150 Denier, in other embodiments does not exceed about 100 Denier, in other embodiments does not exceed about 75 Denier, and in yet other embodiments does not exceed about 50 Denier. In some preferred embodiments, the weight per unit length of warp yarns 72 is at least about 100 Denier, in other embodiments is at least about 150 Denier, in other embodiments is at least about 200 Denier, and in yet other embodiments is at least about 400 Denier. In one preferred embodiment, fill yarns 74 have a weight per unit length of about 200 Denier and warp yarns 72 have a weight per unit length of about 400 Denier. In another preferred embodiment, fill yarns 74 have a weight per unit length of about 175 Denier and warp yarns 72 have a weight per unit length of about 200 Denier. In another preferred embodiment, fill yarns 74 have a weight per unit length of about 100 Denier and warp yarns 72 have a weight per unit length of about 200 Denier. In another preferred embodiment, fill yarns 74 have a weight per unit length of about 75 Denier and warp yarns 72 have a weight per unit length of about 150 Denier. In yet another preferred embodiment, fill yarns 74 have a weight per unit length of about 50 Denier and warp yarns 72 have a weight per unit length of about 100 Denier.

In preferred embodiments, at least one yarn of fabric 70 is at least partially formed of a fiber bundle comprising at least one high tenacity fiber. In some embodiments, such a fiber bundle can comprise an intimate blend and include at least one other non-high tenacity fiber type. In other embodiments, at least one yarn of fabric 70 consists essentially of high tenacity fibers and, in some embodiments, each of yarns 72 and 74 consist essentially of high tenacity fibers. Fiber bundles forming one or more of yarns 72 and 74 can comprise a plurality of essentially continuous filament or, alternatively, one or more fiber bundles forming the fabric can comprise a plurality of staple fibers spun together. In addition, in some embodiments, not shown, at least one, and in other embodiments some, and in yet other embodiments each of the yarns, can comprise plied yarns formed of two or more individual fiber bundles plied together with a degree of secondary twist, for example as previously described in the content of plied intimate blend yarns. In some embodiments, one or more such plied yarns can be formed of a first fiber bundle comprising a high tenacity fiber and a second fiber bundle comprising non-high tenacity fibers.

The above-described high cover factor, small fill yarn constructions can be formed via any of a wide variety of known weaving methods using essentially conventional fabric weaving equipment known to those of ordinary skill in the art. The primary modification to standard weaving techniques for forming puncture-resistant fabrics having conventional constructions (i.e., having a fill yarn weight per unit length exceeding the warp yarn weight per unit length) being that the inventive high cover factor, small fill yarn constructions require a greater number of warp yarn insertions per unit length of fabric in the machine direction and, accordingly, a longer time required to weave a given length of fabric. However, any potential loss of value due to increases in weaving time required to form the high cover factor, small fill fabrics provided according to the invention can be more than offset by the improved properties of the woven fabrics having the inventive construction, when compared to those prepared according to prior art constructions (especially for fabrics woven from yarns consisting essentially of high tenacity fibers). For example, for a given level of fill cover factor and warp cover factor and for a similar level of puncture, cut, and tear resistance, a high cover factor, small fill yarn fabric produced according to the invention utilizing yarns consisting essentially of para-aramid high tenacity fibers can have a weight reduction per unit area of up to about 60% or more, a reduction in fabric stiffness of up to about 75% or more, and a reduction in fabric thickness of up to about 50% or more, when compared to conventional constructions, for example as illustrated in FIGS. 4a and 4b.

Overall, puncture, cut and tear resistance of the fabric layers can be further improved, if desired, by, for example, utilizing the high cover, small fill yarn fabrics in multiple layer constructions, and/or by callendering the fabrics to increase fiber density for a given woven cover factor, and/or through use of various weave-stabilizing and/or puncture-resistant coating systems, such as those described in commonly owned co-pending U.S. patent application Ser. No. 09/691,491 and International Publication No. WO 01/29299.

Another advantage of the inventive construction for providing high cover factor woven fabrics, in which the weight per unit length of the fill yarn is less than the weight per unit length of the warp yarn, is that such fabrics typically can have more balanced tensile properties, in comparison to more conventional designs in which the fill yarns have a weight per unit length equal to or exceeding the weight per unit length of the warp yarns. The greater degree of balance in tensile properties of the high cover, small fill fabrics is a result of the warp yarns having, in general, a lower degree of crimp (i.e., excess length in comparison to the overall length of the fabric in the machine direction), when compared to conventional designs wherein the warp yarns are woven around relatively larger diameter fill yarns (i.e., equal to or larger in size than the diameter of the warp yarns for systems in which the warp yarns and fill yarns are formed of materials having a similar density or specific gravity). For the small fill yarn constructions provided according to the invention, in addition to having, in general, a lower degree of warp crimp owing to the relatively smaller diameter of the fill yarns, because the smaller fill yarns, in many cases, are more flexible than in conventional designs (i.e., because, typically, they can be smaller in diameter) some of the warp crimp will be distributed to the fill yarns after weaving. Accordingly, constructions provided according to the present aspect of the invention can provide woven fabrics in which the degree of crimp is more evenly matched between the warp yarns and the fill yarns, thus leading to the above-mentioned more balanced tensile properties in each of the warp and fill directions. In general, the more highly crimped the yarn is in the woven fabric, the lower will be the ratio of actual tensile breaking strength per cross-sectional area of the yarn to the theoretical maximum tensile breaking strength per cross-sectional area of the fibers forming the yarn. Accordingly, the inventive high cover factor, small fill construction can, in many embodiments, result in a conversion efficiency of the tensile strength of the fibers forming in the fabric (i.e., the ratio of the actual tensile breaking strength of the fabric along a given direction to the theoretical maximum tensile strength of the fibers) substantially higher than typically achievable for the above-described conventional constructions.

As discussed above with regard to intimate blend fabrics, typically, high tenacity yarns consisting essentially of high tenacity fibers, such as para-aramids, are characterized by a relatively large denier per filament/fiber and a relatively low degree of inter-fiber shear, thus making formation of yarns having small weights per unit length difficult when utilizing conventional high tenacity yarn forming techniques. In some embodiments, the small fill, high cover factor fabrics provided according to the invention are be formed from yarns consisting essentially of continuous filament high tenacity fibers. Theoretically, since the mechanical integrity of such yarns is not strongly dependent on the number of individual fibers per yarn or the inter-fiber shear, such continuous filament yarns could be utilized to weave fabrics having yarns, for example small fill yarns, having a weight per unit length of, for example, 30 Denier or less. However, currently continues filament high tenacity yarns having a weight per unit length of less than about 100 Denier are not readily available in commercial quantities.

Alternatively, yarns comprising or consisting essentially of high tenacity fibers can be formed from staple fibers via spinning. In one such embodiment, a well-known Cotton System spinning technique, which comprises necking down a carded web of staple fibers each having a length of between about 1 inch and about 2 inches, can be utilized. For embodiments involving yarns formed from a single fiber bundle consisting essentially of high tenacity staple fibers spun utilizing a Cotton System spinning technique, it is preferred that such yarn, when used as a fill yarn, have a length per unit weight of at least about 50 cotton count and, when used as warp yarns have a length per unit weight of at least about 50 cotton count and furthermore be plied with at least one other like fiber bundle to form a two-ply warp yarn. Alternatively, a Worsted Spinning system technique utilizing staple fibers having a length of between about 2 inches and about 4 inches can be utilized to produce high tenacity yarns having a length per unit weight greater than the above-mentioned values for the Cotton Spinning system spun yarns, since with the Worsted Spinning system techniques, the increased length of the staple fibers improves the stability and strength of the lighter yarns. As discussed above in the context of intimate blend yarns and fabrics, for embodiments involving yarns formed from spun staple fibers, it is preferred that the fiber bundles have a relatively high degree of primary twist to improve their stability, and, for embodiments where the yarns comprise two or more fiber bundles plied together, that the plied yarns be characterized by a relatively high level of secondary twist. For example, in preferred embodiments, fiber bundles formed of spun staple fibers are characterized by a primary twist multiplier of at least about 2.7, in other embodiments at least about 3, in other embodiments at least about 3.5, in other embodiments at least about 4, and in yet other embodiments at least about 5. For embodiments involving yarns comprising two or more plied fiber bundles, it is preferred that such yarns have a secondary ply twist of at least about ¼ that of the level of primary twist of the fiber bundles, in other embodiments of at least about ½ that of the level of primary twist of the fiber bundles, and in other embodiments of at least about the same as the level of primary twist of the fiber bundles. Such high twist, while being preferred and useful for yarns formed from either or both of high tenacity and non-high tenacity fibers, are especially preferred for embodiments involving yarns and fiber bundles consisting essentially of spun high tenacity staple fibers. In addition to, or in place of the relatively high twist multipliers mentioned above, the spun fiber bundles and/or yarns can be stabilized via use of one or more adhesive sizing agents, for example an adhesive sizing agent comprising a water soluble coating, such as, one or more of those selected from the list including, but not limited to, polyvinyl alcohol (PVA), polyacrylic acid (PAA), and starch.

For embodiments of high cover factor, small fill woven fabrics comprising high tenacity fibers and including fill yarns having a weight per unit length of less than about 100 Denier and/or warp yarns having a weight per unit length less than about 200 Denier, it is preferred that the yarns be formed from stretch broken fibers having a relatively long staple length (e.g., 20 inches–40 inches), continuous filament fibers, or be formed of one or more fiber bundles comprising an intimate blend of the high tenacity fibers in combination with finer, more spinnable, natural and/or low tenacity synthetic fibers (preferably with at least 5% of the total fibers of the intimate blend fiber bundle being high tenacity fibers, especially for intimate blend fiber bundles comprising the small yarns), thereby providing a relatively high level of interfiber shear (such fibers and yarns being described in detail above with regard to intimate blend fabrics).

Layered/Laminated Fabric Systems

Another aspect of the present invention involves provision of various multi-layer fabric systems including therein a puncture-resistant layer in combination with one or more additional layers providing one or more desirable features or attributes of a fabric for use as an article of apparel, especially sporting apparel or apparel for use as rugged outerwear. As described in more detail below, the puncture-resistant layer can, in preferred embodiments, comprise a fabric, for example either a woven fabric or a non-woven fabric (such as a knitted or felted fabric (felt)). In some preferred embodiments, the puncture-resistant layer can comprise a woven fabric that is a high cover factor fabric, as previously defined, and/or that comprises or consists essentially of high tenacity fibers. In some embodiments, the puncture-resistant layer can comprise one or more layers of an intimate blend fabric, as described above, and/or a high cover factor, small fill yarn fabric, also as described above. In other embodiments, the puncture-resistant layer can comprise one or more layers of a conventional woven fabric consisting essentially of high tenacity fibers, for example as illustrated previously in FIGS. 4A and 4B. In each of the below-described systems, it should be understood that any two or all of the illustrated layers, unless otherwise indicated, can be stacked together without interlayer bonding or can be bonded together via a variety of chemical and/or physical means, such that each of the layers is bound to at least one other layer, or, alternatively, any two of the layers are bound to at least one other layer. Furthermore, it should be understood the number of layers, their relative positions with respect to each other, and/or the identity of any particular layer is not limited to the examples illustrated, unless otherwise indicated to the contrary.

Figure 6A:
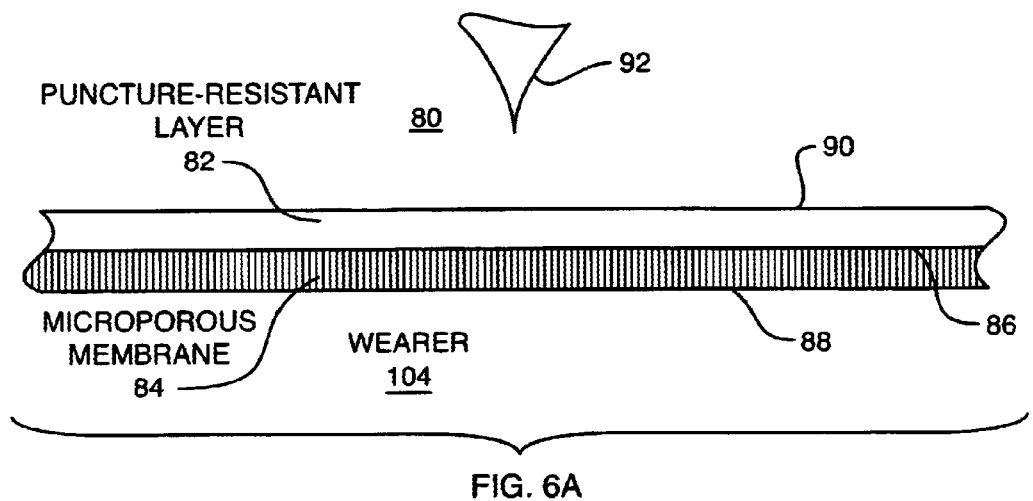
FIG. 6A shows a schematic, cross-sectional illustration of a two layer fabric system according to one embodiment of the invention.

Referring now to FIG. 6A, a multi-layer fabric system 80 is illustrated. Fabric system 80 comprises a first, puncture-resistant layer, 82, which, preferably includes therein at least one high tenacity fiber. Fabric system 80 further includes a second layer 84, which is at least partially coextensive with puncture-resistant layer 82, and which comprises a breathable membrane. The term "breathable" as used herein refers to a membrane or other layer that is permeable to gases, such as air and water vapor, but essentially impermeable to aqueous liquids, such as water. Such breathable barrier materials enable the layered fabric systems to be rendered water resistant or essentially "water proof," while allowing good breathability via the permeation of air through the material and/or the escape of water vapor from a wearer via evaporation from the body and permeation through the coated layer of barrier material. In some embodiments, the membrane 84 can comprise an essentially monolithic preformed sheet or, alternatively, a monolithic coating layer on layer 82. Monolithic membranes that are formed of polymeric materials that have high rates of diffusion for water vapor but do not require cast-in pores are useful for the layered structures. Polymeric materials of urethane, acrylic latexes or other films are suitable for this type of monolithic membrane. These films can be blown, extruded, cast separately and then laminated to the puncture resistant layer(s). These monolithic films may also be coated or cast directly onto the puncture resistant layer(s). The thinner and softer films of this type are most desirable as they have the highest rate of vapor transport and are the most comfortable to a wearer. Such monolithic sheets/films and coatings and materials for forming such are disclosed in commonly owned, co-pending U.S. patent application Ser. No. 09/691,491 and commonly owned International Patent Application Ser. No. PCT/US00/28796 having an International Publication Number of WO 01/29299.

In some preferred embodiments, breathable barrier layer 84 comprises a porous membrane, and, more preferably, a microporous or monolithic membrane. The term "microporous membrane" or "microporous barrier membrane" as used herein refers to a layer of a multi-layer fabric system, which layer includes therethrough a plurality of pores having a size sufficient to prevent the passage of liquid water therethrough, while, at the same time, permitting diffusion and/or convection of water vapor, at substantially ambient temperatures and pressures. The particular pore size necessary for the microporous membrane to function as a water vapor-permeable, liquid water-resistant layer will, as understood by those skilled in the art, depend on the material characteristics and surface properties of the material comprising the microporous membrane. Preferably, the microporous membrane is formed from a hydrophobic polymeric material. In some illustrative embodiments, pores of the microporous membrane can fall within a size range of from about 0.1 micron to about 100 microns. (See below for more detail on microporous membrane layers).

In some embodiments, microporous or monolithic membrane layer 84 comprises a coating adhered to at least a portion of a surface of puncture-resistant layer 82. In preferred embodiments, wherein the microporous or monolithic membrane layer comprises a coating, it is preferred that the coating comprise a polymeric material having a modulus of elasticity of less than about 100,000 psi, more preferably less than about 50,000 psi, more preferably less than about 25,000 psi, more preferably less than about 10,000 psi, and in other preferred embodiments less than about 5,000 psi. In some such preferred embodiments, the coating comprises a conformal coating on the surface of layer 82, as described in greater detail in commonly owned co-pending U.S. patent application Ser. No. 09/691,491 and International Publication No. WO 01/29299. In preferred embodiments, it is preferred that the coating comprising a microporous membrane be formed of an at least somewhat hydrophobic polymeric material, preferably having pores traversing the coating having an effective pore diameter not exceeding about 100 microns, and in other embodiments not exceeding about 10 microns. A partial list of suitable polymeric coating materials for forming microporous membrane coatings can include, but is not limited to, urethane polymers, acrylic latex polymers, butyl, latex, silicone, and neoprene rubbers, polyolefins, polyvinylchloride, polysulfone, etc. Preferably, for embodiments involving a microporous membrane layer 84 comprising a coating layer, layer 84 is formed on surface 86 of layer 82 by depositing a solution containing dissolved polymeric material for forming the microporous membrane onto surface 86, followed by allowing the solution to harden to form microporous membrane layer 84 by solvent evaporation. In such embodiments, the rate of solvent evaporation can be controlled so as to form the above-mentioned plurality of micropores in layer 84 in order to render the layer substantially impermeable to liquid water but readily permeable to water vapor. Methods for forming microporous polymeric membrane layers via controlled solvent evaporation of a cast polymeric solution are well known in the art and described in a variety of standard references related to the subject. The particular parameters for use in forming a microporous membrane coating layer having desired properties for a given polymeric material are readily determinable using no more than routine experimentation and optimization and a variety of routine and straight forwarding screening tests involving the casting of films of polymer solutions of varying thicknesses in a variety of solvents for the polymer followed by solvent evaporation at various controlled rates with subsequent testing of the resultant porous membrane layers for liquid water resistance and water vapor permeability. In the context of the above, preferably the polymer solution for forming a microporous membrane layer is disposed on surface 86 of the puncture resistant layer at a thickness corresponding to a specific weight of the microporous membrane layer of no greater than about 1 ounce per square yard, and more preferably of no greater than about 0.25 ounce per square yard.

In alternative embodiments, as mentioned above, microporous or monolithic membrane layer 84 comprises a separable layer that can either be physically stacked with puncture-resistant layer 82, without being attached thereto, or, alternatively, can be attached to layer 82 to form a laminate system. For embodiments wherein microporous or monolithic membrane layer 84 is attached to puncture-resistant layer 82, layer 84 can be attached to surface 86 of layer 82 by a variety of means, as would be apparent to those of ordinary skill in the art, including, but not limited to, thermal bonding or attachment via a continuous or discontinuous layer of an adhesive. For embodiments where microporous or monolithic membrane layer 84 is attached to puncture-resistant layer 82 via an intermediate adhesive layer, it is preferred that, if the adhesive is not permeable to water vapor and atmospheric gases, that the adhesive be applied in a discontinuous fashion allowing sufficient surface area of contact between layer 84 and layer 82 essentially free of adhesive to permit permeation of water vapor and other gases between surface 88 of microporous or monolithic membrane layer 84 and surface 90 of puncture-resistant layer 82. Alternatively, the adhesive layer may be formed of a polymeric material or materials, which are permeable to water vapor. In some such embodiments, the adhesive can comprise a material including, but not limited to, polyurethanes, acrylic polymers, and poly(vinyl chloride). For embodiments where a microporous membrane layer 84 comprises a separable layer (i.e. not a coating thereon) overlaid with or attached and laminated to a puncture-resistant layer 82, it is preferred that microporous membrane layer 84 comprise a hydrophobic membrane. In some embodiments, such hydrophobic membrane can be comprised of materials including, but not limited to, poly (tetrafluoroethylene) (PTFE—e.g., TEFLON™ or expanded PTFE, e.g. GORETEX™), polyolefins, polyurethanes, foamed neoprene rubber, etc. Membranes comprising the above-mentioned materials having properties and pore sizes rendering them permeable to water vapor but substantially impermeable to liquid water are well-known in the art, and are readily commercially available.

As mentioned above, puncture-resistant layer 82 can comprise essentially any of puncture-resistant layer yielding an overall multi-layer system with desirable performance properties. In preferred embodiments, puncture-resistant layer 82 comprises a fabric. In some such embodiments, puncture-resistant layer 82 comprises a non-woven fabric, such as a knitted fabric or felt. In some preferred embodiments, puncture-resistant layer 82 comprises a woven fabric. In some preferred embodiments, wherein puncture-resistant layer 82 comprises a woven fabric, the woven fabric comprises a high cover factor fabric, for example having warp and fill cover factors and constructions such as those previously described in the context of intimate blend fabrics and high cover/small fill yarn fabrics. In some preferred embodiments, puncture-resistant layer 82 comprises or consists essentially of high tenacity fibers, for example selected from one or more of the high tenacity materials previously described. In some embodiments, puncture-resistant layer 82 is a high cover factor fabric characterized by fill yarns having a weight per unit lengths less than that of the warp yarns of the fabric. In some embodiments, puncture-resistant layer 82 can comprise an intimate blend fabric, such as any of those described above. It should be understood, that, unless otherwise indicated, the above-mentioned list of fabrics, materials, and constructions of puncture-resistant layer 82 can also be employed for any of the other below-mentioned puncture-resistant layers illustrated in the remaining figures and described in the embodiments below.

Because, typically, microporous or monolithic membrane layer 84 is relatively easily damaged, leading to loss of the desirable liquid water-resistant properties of the overall fabric system, in preferred embodiments, puncture-resistant layer 82 is configured and positioned to form an outer surface of fabric system 80, which outer surface is, in use, exposed to puncture, cut, and tear threads, such as, for example, thorn 92. Alternatively, and especially for systems including more than two fabric layers, puncture-resistant layer 82 need not be positioned as the outer-most layer, so long as it is positioned to intercept expected puncture threats before they contact the membrane layer.

Figure 6B:
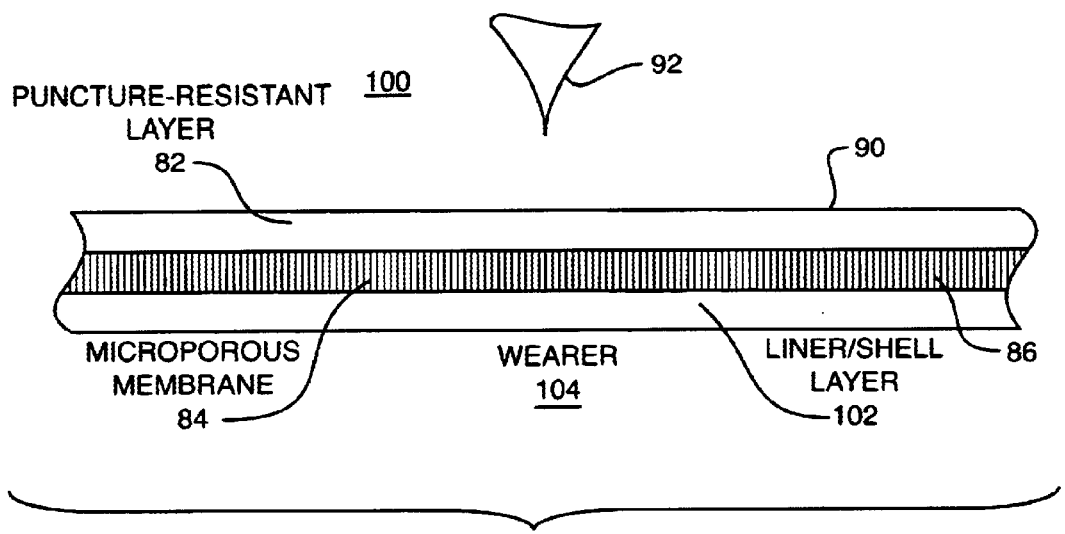
FIG. 6B shows a schematic, cross-sectional illustration of a three layer fabric system according to one embodiment of the invention.

Referring now to FIG. 6B, a three-layer fabric system 100 is illustrated. Fabric system 100 comprises puncture-resistant layer 82 and microporous or monolithic membrane layer 84, as previously described, and further includes a liner/shell layer 102, which is at least partially coextensive with layers 84 and 82. In other embodiments, instead of being located as an inner layer adjacent to wearer 104 (i.e., configured as a liner), layer 102 could, alternatively, comprise a shell layer positioned adjacent to outer surface 90 of puncture-resistant layer 82. In preferred embodiments, liner/shell layer 102 is constructed/selected to have one or more desirable properties, such as, for example, dyeability and printability, softness, smoothness, quietness, abrasion resistance, etc. Significantly, because system 100 has tensile strength and puncture, cut, and tear resistance imparted to the structure from puncture-resistant layer 82, liner/shell layer 102 need not be formed of a high cover factor fabric and need not be formed from high tenacity fibers. By contrast, in preferred embodiments, liner/shell layer 102 comprises a woven fabric formed of a plurality of fill yarns and a plurality of warp yarns, having a fill yarn cover factor less than about 75% and a warp yarn cover factor of less than about 100%. In some preferred embodiments, layer 102 has a fill yarn cover factor less than about 70%, in other embodiments less than about 60%, in other embodiments less than about 55%, and in yet other embodiments less than about 50%. In some preferred embodiments, layer 102 has a warp yarn cover factor less than about 90%, and in other embodiments less than about 85%, and in other embodiments less than about 80%, and in other embodiments less than about 75%. In preferred embodiments, liner/shell layer 102 comprises a light weight fabric including therein at least one yarn having a weight per unit length of between about 20 Denier and about 70 Denier. In addition, in preferred embodiments, layer 102 comprises, and preferably consists essentially of, non-high tenacity fibers having a tensile breaking strength of less than about 10 grams per Denier, in other embodiments less than about 8 grams per Denier, in other embodiments less than about 5 grams per Denier, and yet other embodiments less than about 3 grams per Denier. In some preferred embodiments, liners/shell layer 102 comprises and preferably consists essentially of a plurality of fibers formed of one or more materials including, but not limited to, polyarnides (e.g. nylon), cellulosic materials (e.g., cotton), polyesters, acrylic polymers, and polyolefins.

As discussed above in the context of FIG. 6A, microporous or monolithic membrane layer 84 can comprise a separable layer, which is stacked with or attached to one or both of layers 82 and 102, or, alternatively, microporous or monolithic membrane layer 84 can comprise an adhesive coating attached to at least one of layers 82 and 102, or, alternatively, attached to both layers 82 and 102, thereby securing layers 82 and 102 together in addition to providing liquid water-resistance and water vapor permeability to overall fabric system 100.

Figure 6C:
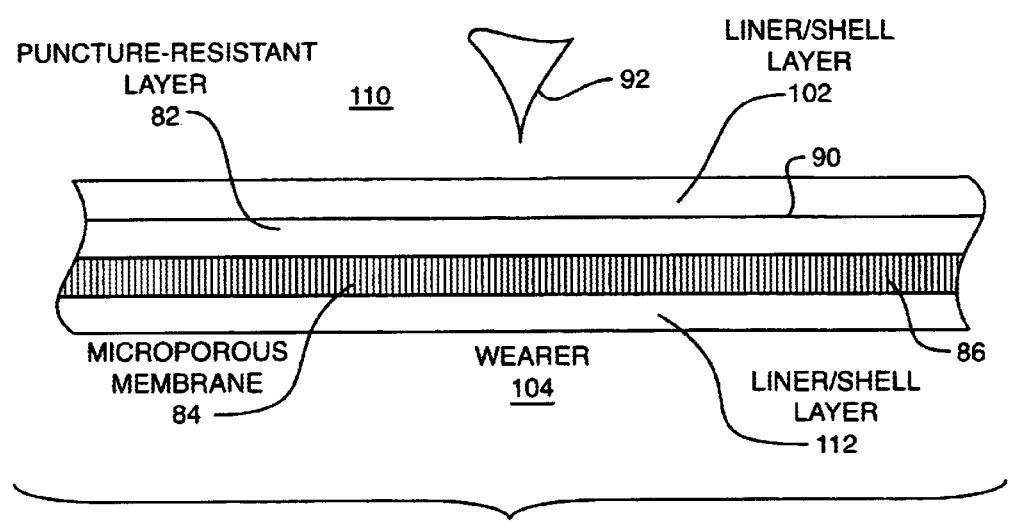
FIG. 6C shows a schematic, cross-sectional illustration of a four layer fabric system according to one embodiment of the invention.

Referring now to FIG. 6C, a four-layer fabric system 110 including puncture-resistant layer 82, microporous or monolithic membrane layer 84, and liner/shell layer 102, as previously described, in combination with a second liner/shell 112 is illustrated. As described in more detail below in the context of FIGS. 7A and 7B, for embodiments including an outer liner/shell layer such as 102, positioned adjacent to a puncture-resistant layer (e.g. layer 82), is preferred that shell layer 102 be formed of fibers comprising a material having a high level of abrasion resistance, for example superior to the abrasion resistance of typical high tenacity fibers (e.g., para-aramids) which puncture-resistant layer 82 can comprise or consist essentially of. Such fabrics, in preferred embodiments, can be formed, for example, from polyamide and/or polyester fibers, or either or both of the above synthetic fibers in combination with a natural fiber, for example cotton. As described in more detail below, for certain preferred embodiments involving such shell fabrics which also have low cover factors (i.e., fill cover factors less than about 75% and warp cover factors less than about 100%), it is preferred that such shell layer be very well attached to the puncture-resistant layer of the fabric system, preferably, such that the peel strength required to separate the fabric layers be on the order of about 2 to about 10 pounds per inch.

Figure 7A:
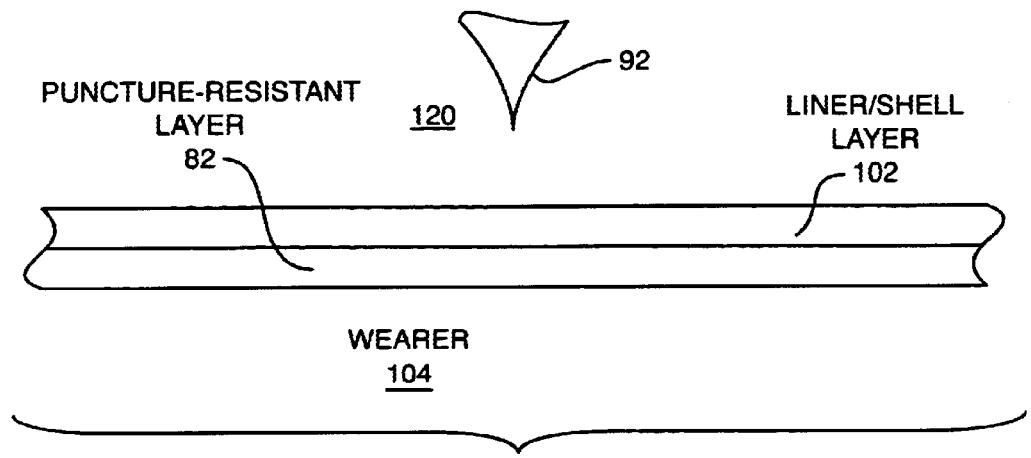
FIG. 7A shows a schematic, cross-sectional illustration of a two layer fabric system according to one embodiment of the invention.

FIG. 7A illustrates a two-layer fabric system 120 including a puncture resistant layer 82, which can be similar to the puncture-resistant layers described above in the context of FIGS. 6A–C, and a liner/shell layer 102, which can be similar to liner/shell layers previously discussed in the context of FIGS. 6A–C. In one embodiment, puncture resistant layer 82 comprises a layer of a high cover factor woven fabric formed of a plurality of fill yarns and a plurality of warp yarns and having a fill yarn cover factor of at least about 75% and a warp yarn cover factor of at least about 100%. In a preferred embodiment, liner/shell layer 102 comprises a low cover factor, lightweight, abrasion-resistant woven fabric where having a fill yarn cover factor of less than about 75% and a warp yarn cover factor of less than about 100%. Puncture-resistant fabric systems, such as 120, are able to provide improved puncture, cut, and tear resistance over conventional fabrics typically used for rugged outerwear, while, at the same time, providing abrasion resistance and/or printability and dyeability via provision of a liner/shell layer, such as 102, such combination resulting in an overall system that has sufficient flexibility, drapeability, and lightness to be well suited for use in the construction of many articles of rugged outerwear apparel. As previously discussed, in some particularly preferred embodiments, puncture resistant layer 82 comprises or consists essentially of yarns comprising or consisting essentially of high-tenacity fibers, and liner/shell layer 102 comprises yarns formed from natural and/or synthetic non-high tenacity fibers, preferably having a high level of abrasion resistance. In some preferred embodiments, as discussed above, puncture-resistant layer 82 can comprise an intimate blend fabric including therein at least one high tenacity fiber and/or a high cover factor/small-fill yarn fabric, as described previously.

As mentioned above, in preferred embodiments, liner/shell layer 102 comprises a relatively loosely-woven, lightweight fabric. In some preferred embodiments, each of the yarns forming liner/shell layer 102 has a weight per unit length of between about 20 Denier and about 70 Denier. In some embodiments, liner/shell layer 102 can be overlaid onto puncture-resistant layer 82 without attaching the two layers to one another. However, it is preferred, especially for embodiments wherein liner/shell layer 102 comprises a lightweight, loosely-woven fabric utilized to provide an enhanced level of abrasion resistance to system 120, that the two layers be attached to one another, and, more preferably, attached to one another such that the peel strength required to separate the two layers is on the order of about 2 to about 10 lbs/inch. A variety of methods of attaching liner/shell layer 102 to puncture-resistant layer 82 that are well known in the art can be employed to attach the layers together. For example, the layers can be attached together via an intermediate layer of an adhesive, for example, including, but not limited to, a solvent-based urethane adhesives, urethane hot melt adhesives, reactive urethane hot melt adhesives, acrylic latex adhesives, poly(vinylchloride)-based adhesives, etc. Alternatively, the layers can be attached together via mechanical bonding methods, for example, including but not limited to a double-beam partial interweave of the fabrics comprising each of the layers, needle punch entangling of the layers, hydroentangling of the layers, etc. Such mechanical attachment methods being well known to those of ordinary skill in the art.

As mentioned previously, in some embodiments, puncture-resistant layer 82 can comprise a non-fabric layer or a non-woven fabric layer, such as a knitted fabric layer or felted fabric layer (felt). In one preferred embodiment, puncture-resistant layer 82 comprises a felted fabric including therein at least one high tenacity fiber, for example, of a fiber type previously described in the context of several of the above-mentioned embodiments and aspects of the invention. In some preferred embodiments, such felted fabric consists essentially of high tenacity fibers. Such felted fabrics can be produced according to a wide variety of well known felt production techniques, for example, including, but not limited to, techniques utilizing carded, air-laid, wet-laid, or cross-lapped webs. From the context of providing desirable level of puncture resistance, true random fiber positioning is preferred to oriented webs. Accordingly, webs manufactured by air-laid and wet-laid processes are somewhat more preferred than the other above-mentioned techniques, because such techniques tend to produce more random fiber positioning. In preferred embodiments, the fibers forming the felted fabric are needle entangled and/or bonded (e.g., using one of the above-mentioned adhesive sizing materials) in order to consolidate the felt material. Using a felted material consisting essentially of para-aramid fibers as an example (the dimensions given below would scale for other felts constructed of other fibers according to the ratio of the specific gravity of such fibers to the specific gravity of para-aramid fibers), preferably, the felted fabric is consolidated such that it has a bulk density, not including any coatings or other materials applied thereto, of at least about 0.3 $g/cm^3$, in other embodiments of at least about 0.4 $g/cm^3$, and in yet other embodiments of at least about 0.5 $g/cm^3$, and an overall weight per unit surface area of between about 3 oz/sq. yd. and about 10 oz/sq. yd., and a thickness of between about 0.012 inch and about 0.2 inch, in other embodiments between about 0.015 inch and about 0.1 inch, and in yet other embodiments between about 0.015 inch and about 0.05 inch.

Figure 7B:
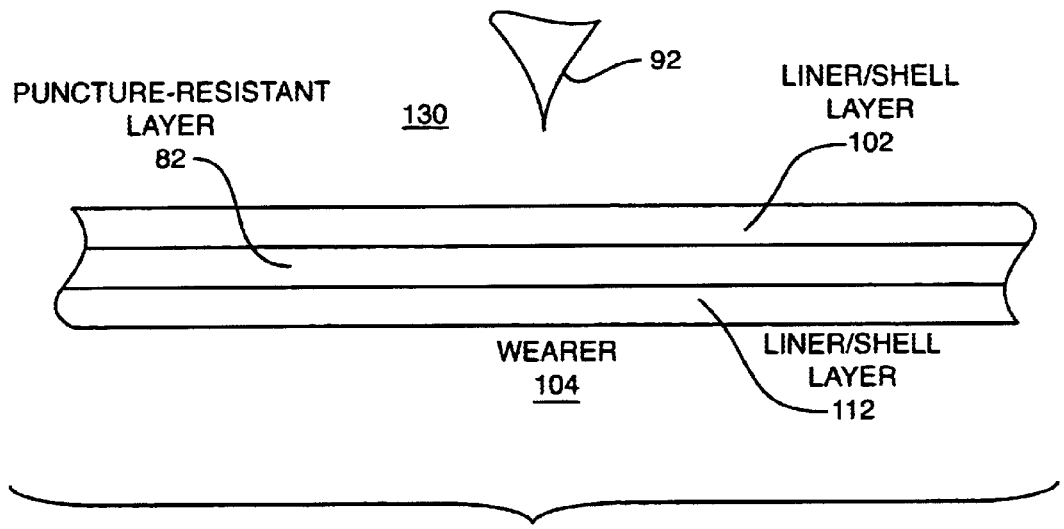
FIG. 7B shows a schematic, cross-sectional illustration of a three layer fabric system according to one embodiment of the invention.

Referring now to FIG. 7B, multi-layer fabric system 130 is substantially similar to previously described fabric system 120 except including a third, liner/shell layer 112 that is at least partially coextensive with layers 82 and 102. Layer 112 can, in some embodiments, be identical to, or substantially similar to, liner/shell layer 102 previously described. In other embodiments, also as described above, layer 112 can, instead, comprise a different material then layer 102, such as, for example, a non-fabric material, for example, a barrier and/or microporous or monolithic membrane. In some preferred embodiments, layer 112 can comprise a non-woven or woven fabric constructed to have a desirable level of softness, surface feel, warmth, etc., in order to create a comfortable interface between an article of apparel comprising fabric system 130 and wearer 104.

In some preferred embodiments, layer 112 and/or, optionally, layer 102, can comprise a random fabric web needled into and through one, and preferably both of the other two fabric layers. In addition, layer 102 as previously configured in the two-layer fabric system 120 of FIG. 7A could also, similarly, comprise such a needled random fabric web, if desired. Such needled random fabric webs can comprise either high tenacity fibers and/or non-high tenacity fibers, for example non-high tenacity fibers having a desirable level of abrasion resistance, dyeability, printability, etc. Such needled fabric webs can result in a soft, quiet, suede-like or flannel-like surface layer, which layer is well bonded to the rest of the layers of the system and provides good breathability and water vapor transport. Also, if desired, the three-layer system 130 illustrated in FIG. 7B can include a fourth layer or more layers providing additional functionality as needed and desired.

Dyeability/Printability of Fabrics Comprising High Tenacity Fibers and Pre-Washing of Fabrics Comprising High Tenacity Fibers to Increase Puncture Resistance and Flexibility Dyeability and printability are important attributes of fabrics for use in rugged outerwear applications. In order to be appealing to consumers of rugged outerwear apparel products, the quality, consistency, and variety of colors available must be high. In addition, printed and/or dyed patterns, such as camouflage patterns, are especially useful and desirable for rugged outerwear applications. As discussed above in the context of intimate blend fabrics, fabrics constructed of natural fibers, for example, cotton, and/or many synthetic, non-high tenacity fibers, for example, polyamides, polyesters, acrylic polymers, polyolefins, typically utilized in constructing conventional rugged outerwear, often have excellent dyeability and/or printability characteristics. In contrast, typical prior art fabrics constructed from high tenacity fibers, such as the high tenacity fibers and materials discussed previously, are not readily dyeable and do not, typically, yield fabrics, upon dyeing, having an essentially visually uniform color density of the dyed color. Typically, in order to form fabric materials of a color different from the base color of the high tenacity fiber material forming the fabric, in prior art techniques, a dye or coloring agent was added directly to the high tenacity polymeric material itself prior to extrusion to form fibers or filaments, which fibers or filaments were subsequently formed into yarns and fabrics. However, such pre-fiber formation dyeing can be expensive, lacks flexibility, is not suitable for pattern dyeing or printing, and is typically only useful for colors that are darker than the base color of the high tenacity material forming the high tenacity fibers (e.g., para-aramid and liquid crystalline polyester have a base color of gold/yellow).

As mentioned above, the present invention provides a number of fabrics and fabric systems comprising high tenacity fibers, which have improved dyeability and printability characteristics over the above-mentioned prior art fabrics. For example, in the multi-layer/laminate systems described above, one or more layers of puncture-resistant fabrics comprising or consisting essentially of high tenacity fibers can be combined with one or more layers of fabrics comprising or consisting essentially of non-high tenacity fibers of a class that are highly dyeable and printable (e.g., cotton fibers, polyamide fibers, polyester fibers, polyacrylic fibers, polyolefin fibers, etc.).

In particular, the above-described intimate blends can provide both desirable levels of cut, tear, and puncture resistance, owing to their containing one or more types of high tenacity fibers in their structure, in addition to excellent dyeability and printability, owing to their also containing a plurality of highly printable and dyeable fibers, in preferred embodiments. Therefore, in one aspect, the present invention provides an intimate blend fiber bundle formed of a plurality of fibers, at least 5% of which are high tenacity fibers, where the fiber bundle also includes a plurality of dyeable fibers, for example, natural and/or synthetic non-high tenacity fibers of the types described previously, such that upon exposure of the fiber bundle to a fabric dye, the fiber bundle becomes dyed to an essentially visually uniform color density.

Essentially any of the above-mentioned high tenacity materials and fiber types for use in forming intimate blends can be utilized, together with more printable, dyeable fiber types, to yield such a dyeable fiber bundle. Such fiber bundles can be constructed and formed as described above in the context of the discussion of intimate blends and can be formed into single-ply and/or multi-ply yarns and woven into intimate blend fabrics, also as described previously. Any of a wide variety of well known fabric dyes able to dye the dyeable, non-high tenacity fibers of the intimate blend can be utilized for dyeing the intimate blend fiber bundles and fabrics, including, for example, cationic dyes, anionic dyes, and polyester dyes. Significantly, because many natural and synthetic materials for forming the dyeable, non-high tenacity fibers utilized in the intimate blends can have a base color significantly lighter than the base color of the high tenacity fibers, it is possible to dye the intimate blend fiber bundles, yarns, and fabrics to have a visually uniform color density that is lighter in color than the undyed color of the high tenacity fibers within the intimate blend. As mentioned above, for such dyeable intimate blends, it is preferred that at least about 5% of the fibers forming an intimate blend fiber bundle be high tenacity fibers, in other embodiments, at least 10% of the fibers are high tenacity fibers, in other embodiments at least 20%, in other embodiments at least 50%, in other embodiments at least 65%, in other embodiments at least 75% and in yet other embodiments at least 85% of the fibers are high tenacity fibers.

The pre-washing of roll stock of a fabric before forming the fabric into an article of apparel is well known and widely practiced in the art for materials formed of natural fibers, for example in denim processing. Previously, however, such pre-wash methods have been typically limited to use in cotton or cotton-blend material applications. It has been found, within the context of the present invention, that such pre-wash methods can have a strong effect on the flexibility and/or puncture resistance of fabrics comprising or consisting essentially of high tenacity fibers, for example, of the types discussed previously. Accordingly, in one aspect, the invention provides a method of pre-washing roll stock of a fabric that includes at least one high tenacity fiber to increase the puncture resistance of the fabric. Such a pre-wash method can also be employed for essentially any of the above-mentioned high cover factor puncture-resistant fabrics discussed previously to increase puncture resistance and/or flexibility including, for example, intimate blend fabrics and high tenacity fabrics consisting essentially of high tenacity fibers.

A variety of well known pre-wash techniques utilized for cotton or cotton-blend material can potentially be utilized in the context of the present invention to perform the inventive pre-wash method of increasing the puncture resistance and/or flexibility of fabrics comprising high tenacity fibers. In general, such a pre-washing method will comprise a step of saturating the fabric with an aqueous solution of a surfactant, followed by subjecting the fabric to mechanical flexing and agitation. The duration of the pre-wash will, as will be apparent to those of ordinary skill in the art, depend on the mechanical intensity of the flexing and agitation imparted by the particular washing equipment employed. In one embodiment, wherein the mechanical flexing and agitation is performed within a commercial drum washing machine, a typical duration of the mechanical flexing and agitation step of the pre-wash method would range from about 1 hour to about 5 hours. Optimal conditions and agitation times for increasing the puncture resistance and flexibility of fabrics comprising high tenacity fibers will, as will be apparent to those of ordinary skill in the art, depend upon the particular materials and construction of the fabrics undergoing the pre-wash treatment. The determination of selection of such parameters is best determined for a given fabric via routine experimentation and optimization involving the adjustment of parameters and exposure times followed by subsequent testing of the pre-washed materials for puncture resistance and bending stiffness (utilizing well-known ASTM testing methods). Conditions which yield a desirable and/or maximal increases in the above properties in comparison to the material prior to the pre-wash would constitute preferred operating conditions for performing the pre-wash method for a given fabric.

As one example, for an embodiment of an intimate blend fabric woven of cotton warp yarns and fill yarns formed of an intimate blend of cotton, polyester, and para-aramid fibers, the fabric is preferably washed at a full boil with a detergent/surfactant with the pH adjusted to 9–10. This wash liquor and conditions are preferably selected to de-size the fabric (i.e. remove or reduce the quantity of any sizing agents present in the fabric). The material can be run open width or as a rope if the process is open with the tension adjusted to be low. The material can then be rinsed with boiling water and dried open width on steam drums or with many other known textile drying systems. The drying process preferably is performed under a low tension to allow for maximum shrinkage. The wash process time can be selected and adjusted by trial and error to determine the point were the material reaches the desired level of improvement of puncture resistance and flexibility.

Under such preferred conditions, the pre-washing step can increase the puncture resistance of a fabric comprising high tenacity fibers by at least about 5%, in other embodiments by at least about 10%, in other embodiments by at least about 15%, in other embodiments by at least about 20%, and in yet other embodiments by at least about 25%, while decreasing the bending stiffness of the fabric by at least about 5%, in other embodiments by at least about 10%, in other embodiments by at least about 15%, in other embodiments by at least about 20%, and in yet other embodiments by at least about 25%.

The function and advantage of these and other embodiments of the present invention will be more fully understood from the examples below. The following examples are intended to illustrate the benefits of the present invention, but do not exemplify the full scope of the invention.

EXAMPLES 1–7

Intimate Blend Fiber Bundle Fabrics

The table below summarizes the characteristics and relative performance of six tightly woven intimate blend fabrics. The fabrics were each woven with essentially the same construction utilizing yarns formed from single fiber bundles spun using a Cotton System spinning method. The fiber bundles forming the yarns for each of the illustrated fabrics had the same fiber count as measured in the cross section of the bundle. The fiber bundles were intimate blends of a first, high tenacity fiber type (Fiber 1), and a second, low tenacity fiber type (Fiber 2). The "Blend" column represents the percentage of performance fibers/percentage of low tenacity fibers in the fiber bundles. (dpf=Denier per fiber; d=Denier; and cc=Cotton Count; #"=# inches).

TABLE 1

Light Denier Cotton System Yarn with Constant Fiber Count in Cross Section

| Fiber 1 | Fiber 2 | Blend | Staple | Spinning | Size | Puncture | Abrasion | Cut |
|---|---|---|---|---|---|---|---|---|
| Para Aramid 1.5 dpf | Nylon 1.2 dpf | 50/50 | 1.5–2" | Cotton System | 57/1 cc (90 d) | Good | Good | Good |
| Para Aramid 1.5 dpf | Polyester 0.8 dpf | 50/50 | 1.5–2" | Cotton System | 72/1 cc (70 d) | Good | Fair | Good |
| Para Aramid 1.2 dpf | Polyester 0.8 dpf | 75/25 | 1.5–2 | Cotton System | 61/1 cc (94 d) | Very good | Poor | Very good |
| Para Aramid 1.5 dpf | Polyester 0.8 dpf | 25/75 | 1.5–2" | Cotton System | 83/1 cc (62 d) | Fair | Fair | Fair |
| Para Aramid 1.5 dpf | Combed Cotton long staple | 50/50 | 1.5–2" | Cotton System | 57/1 cc (90 d) | Good | Good | Good |
| Para Aramid 1.5 dpf | Combed Cotton long staple | 20/80 | 1.5–2" | Cotton System | 50/1 cc (105 d) | Good | Fair | Fair |
| Liquid Crystal Polyester 5 dpf | Polyester 0.8 dpf | 50/50 | 1.5–2" | Cotton System | 50/1 cc (105 d) | Very good | Very good | Very good |

EXAMPLE 8

Para-aramid/Polyester/Cotton Intimate Blend Fabric

The fabric of the present example was designed to be well suited for general sports wear applications. In particular the fabric has excellent resistance to puncture by thorns and other sharp objects. The use of the fabric in conjunction with a breathable barrier membrane, in a multi-layer system, is very effective as the cut and puncture resistance of this material protects the membrane from damage.

This fabric can protect against snakebite and has a needle puncture resistance (measured by the penetration test described in detail in commonly owned U.S. Provisional Patent Application Ser. No. 60/229,708) greater than 2 lbs. for a multi-layer fabric with two layers of the fabric of the present example.

This fabric is very soft and has good aesthetics in use. The design can allow for cost effective dying and the combination of cotton with the para aramid gives a very aesthetic surface to the fabric. In many applications the use of durable water repellent layer(s) in combination with the intimate blend fabric is advantageous.

The fiber bundles comprising the yarns of the fabric were formed from combed ring spun long staple fibers. The overall intimate blend fabric construction design was roughly 15% para aramid by weight.

Detailed Design of the Fabric

Warp: 110 warp yarns per inch. Warp yarns were formed of cotton staple fibers with a two-ply construction, each fiber bundle of the plied yarn having a length per unit weight of approximately 60 Cotton Count (i.e. a 60/2 construction).

Fill: 70–80 fill yarns per inch. Each yarn comprising a fill pick was an intimate blend 3-ply construction of the above-mentioned 60/2 cotton plied fiber bundles twisted together with a 70/1 (i.e. single fiber bundle of approximately 70 Cotton Count) intimate blend fiber bundle formed of microdenier polyester and para aramid fibers in a 20%/80% (polyester/para aramid) blend.

Round Packed Cover Factors: 60–65% in the warp; 85–95% in the fill.

EXAMPLES 9–13

Comparison of High Cover Factor, Small Fill Fabrics to Conventional High Cover Factor Fabric Constructions Each of the woven fabrics in examples 9–11 below listed in Table 2 was prepared from yarns consisting of liquid crystalline polyester (VECTRAN™) high tenacity fibers and woven to provide essentially the same warp and fill cover factors. Each of the below constructions could also be made from intimate blend yarns and/or non-high tenacity fiber-based yarns if desired. Examples 12 and 13 are prophetic. Example 9 fabric was constructed to have a conventional construction with a ratio of fill yarn size to warp yarn size of 2/1. Example 10 fabric was constructed to have a conventional construction with a ratio of fill yarn size to warp yarn size of 1/1. Example 11 fabric was constructed with a small fill construction according to the invention, with a ratio of fill yarn size to warp yarn size of 1/2. Examples 12 and 13 are similarly constructed with a small fill construction according to the invention, with a ratio of fill yarn size to warp yarn size of 1/2. As can be seen, each of the small fill designs is significantly lighter than either of the conventional designs.

TABLE 2

High cover factor, high tenacity fabric constructions

| Example | Warp Size (Denier) | Fill Size (Denier) | Warp Count (yarns per inch) | Fill Count (yarns per inch) | Fill Cover Factor (%) | Warp Cover Factor (%) | Weight (oz/sq. yd) |
|---|---|---|---|---|---|---|---|
| 9  | 200 | 400 | 110 | 65  | 85 | 140 | 7.2  |
| 10 | 200 | 200 | 110 | 77  | 85 | 140 | 5.75 |
| 11 | 200 | 100 | 110 | 90  | 85 | 140 | 4.75 |
| 12 | 150 | 75  | 130 | 110 | 85 | 140 | 4    |
| 13 | 100 | 50  | 160 | 135 | 85 | 140 | 3.2  |

EXAMPLES 14–16

High Tenacity Felts for Providing Cut Resistant Layers for Multi-layer and Laminate Fabric Systems The following felted fabric layers are constructed from high tenacity fibers utilizing an air laid web manufacturing technique felts with random fiber positioning. The felts are consolidated as indicated and their cut performance is tested using the ASTM F-1790 test, and their puncture performance is tested using a standard needle puncture test utilizing an INSTRON™ force measurement machine with a 0.05 inch diameter hand sewing needle in conformance with ASTM D-1342.

TABLE 3

Felts for cut-resistant layers in multi-layer/laminate fabric systems

| Fiber type | Staple Length (inches) | Entangling | Bonding Adhesive | Calendering | Weight | Cut performance | Puncture performance |
|---|---|---|---|---|---|---|---|
| Para-Aramid | 1.5 | Needle | None | None | 3–6 oz | Good | Good |
| UHMW PE | 1.5 | Needle | Low melt sheath | Yes | 3–5 oz | Good | Fair |
| LC Polyester | 1.5 | Needle | Soft urethanes | Yes | 3–6 oz | Good | Good |

UHMW PE = Ultra high molecular weight polyethylene; LC = liquid crystalline; "good" cut performance = results exceed 700 grams-force; "good" puncture resistance = resistance to forces greater than 0.75 lbf.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, provided that such features, systems, materials and/or methods are not mutually inconsistent, is included within the scope of the present invention. In the claims, all transitional phrases or phrases of inclusion, such as "comprising," "including," "carrying," "having," "containing," "formed of," "made of" and the like are to be understood to be open-ended, i.e. to mean "including but not limited to." Only the transitional phrases or phrases of inclusion "consisting of" and "consisting essentially of" are to be interpreted as closed or semi-closed phrases.

What is claimed:

1. An article comprising:
    a plurality of fill yarns, having a weight per unit length of a first value, and a plurality of warp yarns, having a weight per unit length of a second value greater than the first value, woven to form a fabric having a fill yarn round packed cover factor of at least about 75% and a warp yarn round packed cover factor of at least about 35%.

2. The article as in claim 1, wherein the fabric has a fill yarn round packed cover factor of at least about 75%.

3. The article as in claim 1, wherein the fabric has a fill yarn round packed cover factor of at least about 80%.

4. The article as in claim 1, wherein the fabric has a fill yarn round packed cover factor of at least about 88%.

5. The article as in claim 1, wherein the fabric has a fill yarn round packed cover factor of at least about 90%.

6. The article as in claim 1, wherein the fabric has a fill yarn round packed cover factor of at least about 90%.

7. The article as in claim 1, wherein the first value does not exceed about 400 Denier.

8. The article as in claim 1, wherein the second value is at least about 100 Denier.

9. The article as in claim 1, wherein the first value is about 200 Denier and the second value is about 400 Denier.

10. The article as in claim 1, wherein at least one yarn is at least partially formed of a fiber bundle comprising at least one fiber of a first type having a tensile breaking strength of at least about 10 g/Denier.

11. The article as in claim 10, wherein at least one yarn consists essentially of fibers having a tensile breaking strength of at least about 10 g/Denier.

12. The article as in claim 11, wherein each of the plurality of fill yarns and warp yarns consists of fibers having a tensile breaking strength of at least about 10 g/Denier.

13. The article as in claim 12, wherein the fiber bundle comprises a plurality of essentially continuous filament fibers.

14. The article as in claim 13, wherein the fiber bundle comprises a plurality of staple fibers spun together.

15. The article as in claim 14, wherein the fiber bundle has a primary twist multiplier of at least about 2.7.

16. The article as in claim 14, wherein the plurality of staple fibers includes at least one fiber of a first type having a tensile breaking strength of at least 10 g/Denier and at least one fiber of a second type having a tensile breaking strength less than about 10 g/Denier.

17. The article as in claim 16, wherein the at least one fiber of the first type is formed of a material selected from the group consisting of; para-aramids, liquid crystal polyesters, ultra-high molecular weight polyethylenes, and poly(p-phenylene-2, 6-benzobisoxazole)(PBO).

18. The article as in claim 16, wherein the at least one fiber of the second type is formed of a material selected from the group consisting of; polyamides, cellulosic materials, polyesters, acrylic polymers, meta-aramids, and polyolefins.

19. The article as in claim 14, wherein at least one yearn is at least partially formed of at least a first fiber bundle and a second fiber bundle plied together.

20. The article as in claim 19, wherein the yarn has a secondary ply twist of at least about ¼ that of a primary twist of the first fiber bundle and the second fiber bundle.

21. The article as in claim 19, wherein the first fiber bundle comprises the fiber bundle comprising at least one fiber of the first type and the second fiber bundle comprises at least one fiber of a second type having a tensile breaking strength less than about 10 g/Denier.

22. The article as in claim 21, wherein the at least one fiber of the first type is formed of a material selected from the group consisting of; para-aramids, liquid crystal polyesters, ultra-high molecular weight polyethylenes, and poly(p-phenylene-2, 6-benzobisoxazole)(PBO).

23. The article as in claim 21, wherein the at least one fiber of the second type is formed of a material selected from the group consisting of; polyamides, cellulosic materials, polyesters, acrylic polymers, meta-aramids, and polyolefins.

24. The article as in claim 19, wherein each of the first fiber bundle and the second fiber bundle comprise at least one fiber of the first type and at least one fiber of a second type having a tensile breaking strength less than about 10 g/Denier.

25. The article as in claim 24, wherein the at least one fiber of the first type is formed of a material selected from the group consisting of; para-aramids, liquid crystal polyesters, ultra-high molecular weight polyethylenes, and poly(p-phenylene-2, 6-benzobisoxazole)(PBO).

26. The article as in claim 25, wherein the at least one fiber of the second type is formed of a material selected from the group consisting of; polyamides, cellulosic materials, polyesters, acrylic polymers, meta-aramids, and polyolefins.

27. An article of apparel formed, at least in part, from the fabric as recited in claim 1.

28. The article of apparel as in claim 27, wherein the article of apparel is selected from the group consisting of; gloves, aprons, chaps, pants, boots, gators, shirts, jackets, coasts, socks, shoes, protective suits, undergarments, vests, waders, hats, and gauntlets.

29. An article as in claim 1, said fill yarns and said warp yarns comprised substantially of fibers at least about four inches in length.

30. A method comprising the step of:
    weaving a plurality of fill yarns having a weight per unit length of a first value together with a plurality of warp yarns having a weight per unit length of a second value greater than the first value to form a woven fabric having a fill yarn round packed cover factor of at least about 75% and a warp yarn round packed cover factor of at least about 35%.

31. The method as in claim 30, further comprising before the weaving step, the steps of:
    forming at least one fiber bundle by bundling together a plurality of essentially continuous filament fibers; and
    forming at least one yarn of the plurality of yarns at least in part from the fiber bundle.

32. The method as in claim 30, said fill yarns and said warp yarns comprised substantially of fibers at least about four inches in length.

33. The method as in claim 30, further comprising before the weaving step, the steps of:
    forming at least one fiber bundle by spinning together a plurality of staple fibers; and
    forming at least one yarn of the plurality of yarns at least in part from the fiber bundle.

34. The method as in claim 33, wherein the fiber bundle is formed by a Cotton System spinning process and the length of the staple fibers does not exceed about two inches.

35. The method as in claim 33, wherein the fiber bundle is formed by a Worsted System spinning process and the length of the stable fibers exceeds about two inches.

36. The method as in claim 33, wherein the fiber bundle has a primary twist multiplier of between at least about 3.5 and at least about 5.0, and preferably of at least about 4.5.

37. The method as in claim 33, wherein the step for forming the at least one yarn comprises plying together the fiber bundle with at least one other fiber bundle.

38. The method as in claim 37, wherein the yarn has a secondary ply twist of at least about ¼ that of a primary twist of the fibers forming the at least one yarn.

39. An article comprising a plurality of fill yarns, having a weight per unit length of a first value, and a plurality of warp yarns, having a weight per unit length of a second value greater than the first value, woven to form a fabric having a fill yarn round packed cover factor of at least about 75% and a warp yarn round packed cover factor of at least about 35%, at least one of the plurality of yarns forming the fabric comprising at least one fiber bundle formed of spun stable fibers and having a primary twist multiplier of at least about 2.7.

40. The article as in claim 39, wherein the fabric has a fill yarn round packed cover factor of at least about 75%.

41. The article as in claim 39, wherein the fabric has a fill yarn round packed cover factor of at least about 80%.

42. The article as in claim 39, wherein the fabric has a fill yarn round packed cover factor of at least about 88%.

43. The article as in claim 39, wherein the fabric has a fill yarn round packed cover factor of at least about 90%.

44. The article as in claim 39, wherein the fabric has a fill yarn round packed cover factor of at least about 92%.

45. The article as in claim 39, wherein the fiber bundle has a primary twist multiplier of between at least about 3.5 and at least about 5.0, and preferably of at least about 4.5.

46. The article as in claim 39, wherein at least one of the plurality of yarns forming the fabric comprises at least two fiber bundles plied together to form a plied yarn.

47. The article as in claim 46, wherein the plied yarn has a secondary ply twist of between at least about ¼ and at least about equal that of a primary twist of the at least two fiber bundles.

48. The article as in claim 39, wherein the fiber bundle is formed by a Cotton System spinning process and the length of the staple fibers does not exceed about two inches.

49. The article as in claim 39, wherein the fiber bundle is formed by a Worsted System spinning process and the length of the stable fibers exceeds about two inches.

50. An article of apparel formed, at least in part, from the fabric as recited in claim 39.

51. The article of apparel as in claim 50, wherein the article of apparel is selected from the group consisting of; gloves, aprons, chaps, pants, boots, gators, shirts, jackets, coasts, socks, shoes, protective suits, undergarments, vests, waders, hats, and gauntlets.

* * * * *